(12) United States Patent
Morimoto

(10) Patent No.: US 8,426,495 B2
(45) Date of Patent: Apr. 23, 2013

(54) RADIATION-CURABLE INK COMPOSITION FOR INKJET RECORDING, INKJET RECORDING METHOD, AND PRINTED MATTER

(75) Inventor: Kiyoshi Morimoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 336 days.

(21) Appl. No.: 12/698,674

(22) Filed: Feb. 2, 2010

(65) Prior Publication Data

US 2010/0221507 A1   Sep. 2, 2010

(30) Foreign Application Priority Data

Feb. 27, 2009   (JP) ................ 2009-046568

(51) Int. Cl.
| | |
|---|---|
| *B05D 3/02* | (2006.01) |
| *B05D 5/00* | (2006.01) |
| *B32B 9/04* | (2006.01) |
| *B41J 2/14* | (2006.01) |
| *B41J 2/01* | (2006.01) |
| *B41J 2/16* | (2006.01) |
| *B41J 2/17* | (2006.01) |
| *B41J 2/175* | (2006.01) |
| *B41M 5/00* | (2006.01) |
| *C07D 209/76* | (2006.01) |
| *C08B 37/00* | (2006.01) |
| *C08K 5/00* | (2006.01) |
| *C08K 5/34* | (2006.01) |
| *C08K 5/48* | (2006.01) |
| *C08K 5/3435* | (2006.01) |
| *C09B 67/00* | (2006.01) |
| *C09D 5/00* | (2006.01) |
| *C09D 11/00* | (2006.01) |
| *G01D 11/00* | (2006.01) |

(52) U.S. Cl.
USPC ............ 523/160; 347/1; 347/51; 347/85; 347/95; 347/100; 347/102; 427/256; 427/288; 427/372.2; 427/385.5; 428/32.1; 428/411.1; 522/7; 523/161; 524/89; 524/90; 524/91; 524/102; 524/105

(58) Field of Classification Search ...... 522/7; 523/160, 523/161; 524/89, 90, 91, 102, 105; 347/1, 347/85, 95, 100, 51, 102; 427/256, 288, 427/372.2, 385.5; 428/32.1, 411.1
See application file for complete search history.

(56) References Cited

FOREIGN PATENT DOCUMENTS

| EP | 2042570 | * | 1/2009 |
|---|---|---|---|
| JP | 2008-207425 A | | 9/2008 |

* cited by examiner

*Primary Examiner* — Patrick Niland
(74) *Attorney, Agent, or Firm* — Birch, Stewart, Kolasch & Birch, LLP

(57) ABSTRACT

The invention provides a radiation-curable ink composition for inkjet recording, the ink composition containing at least: a specific azo compound, a tautomer of the azo compound, a salt of the azo compound, a salt of the tautomer, a hydrate of the azo compound, a hydrate of the tautomer, or any combination thereof; a polymer dispersant; a cationic polymerizable compound; and a cationic polymerization initiator. The invention further provides an inkjet recording method including ejecting and curing the ink composition. The invention further provides a printed matter formed by the inkjet recording method.

Figure 3:
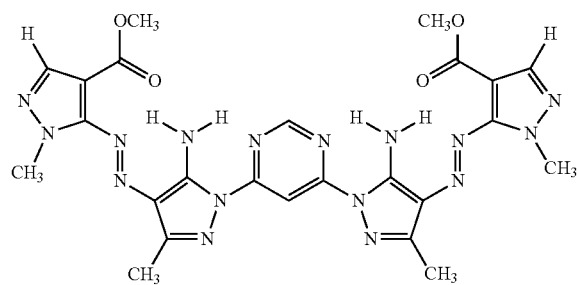
Figure 4:
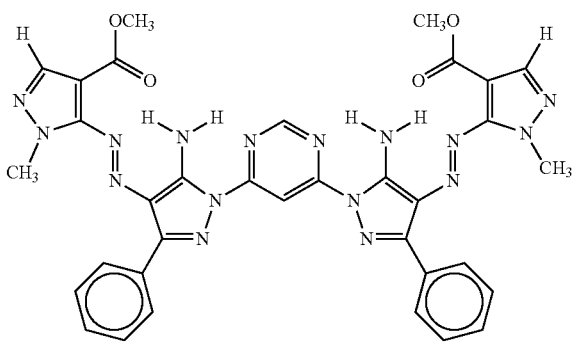
Figure 5:
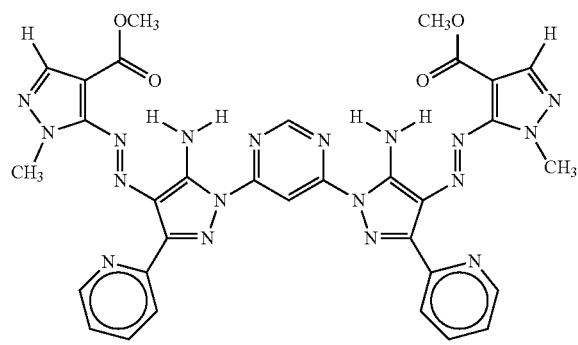
Figure 6:
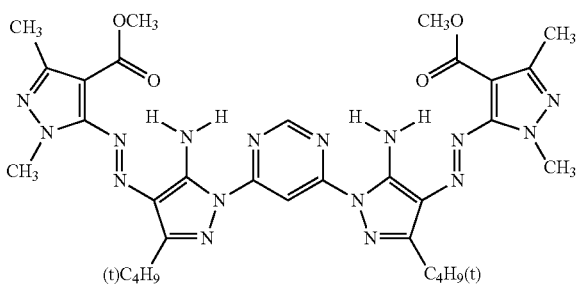
Figure 7:
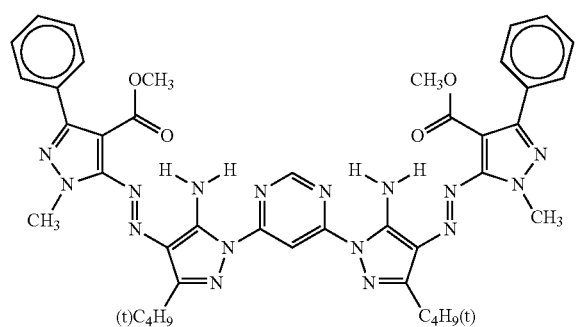
Figure 8:
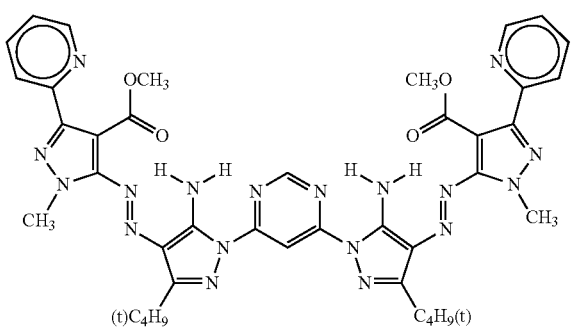
Figure 9:
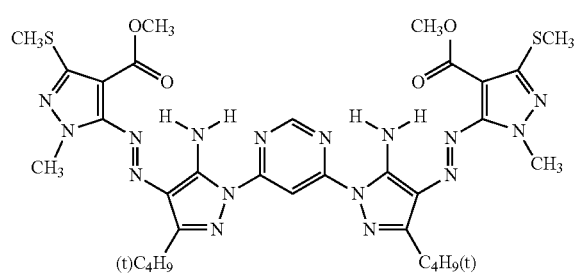
Figure 10:
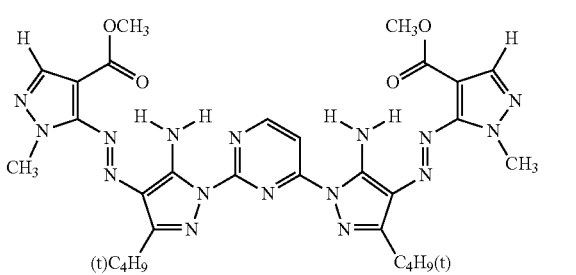
Figure 21:
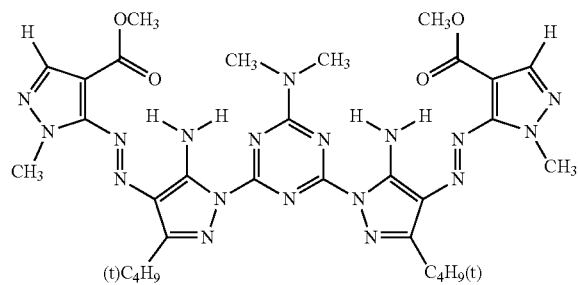
Figure 22:
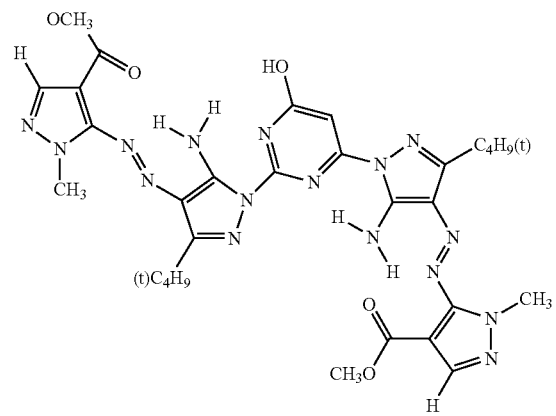
Figure 23:
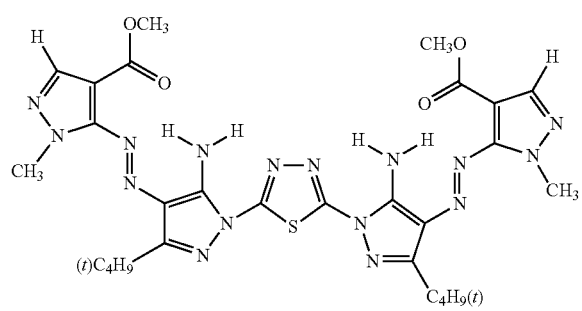
Figure 24:
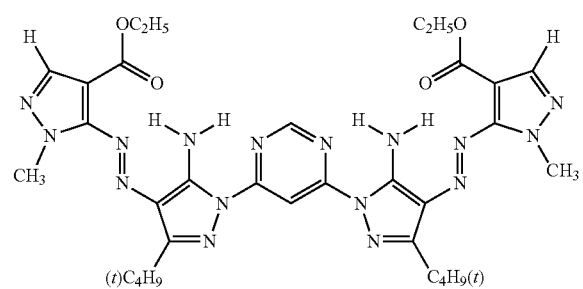
Figure 25:
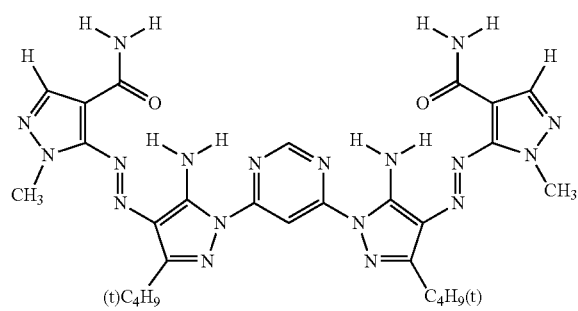
Figure 26:
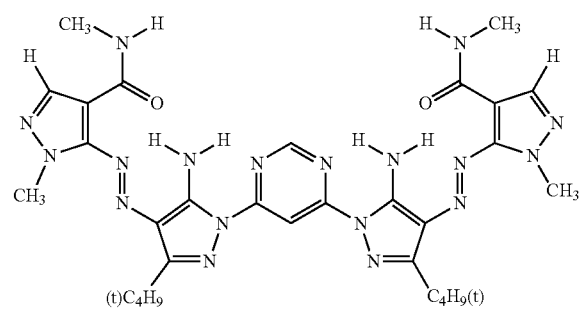
Figure 27:
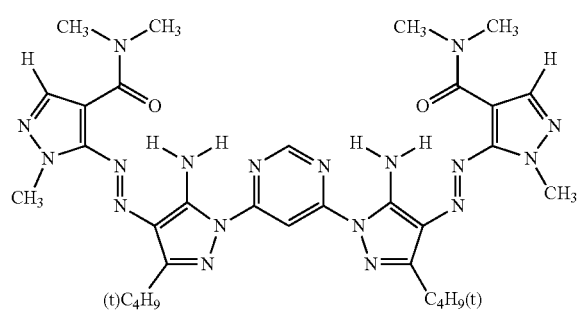
Figure 28:
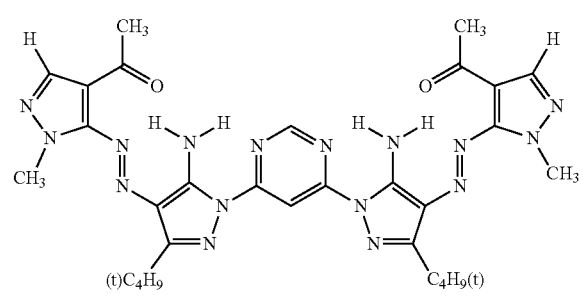
Figure 38:
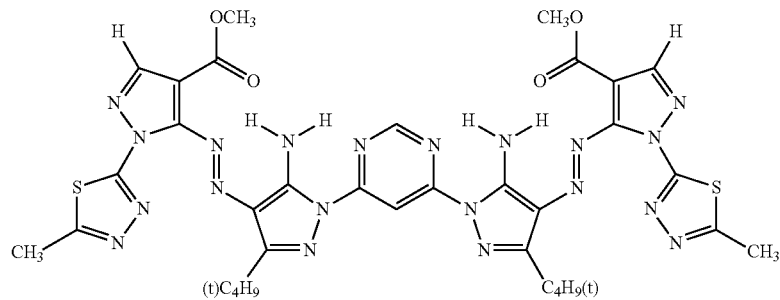
Figure 39:
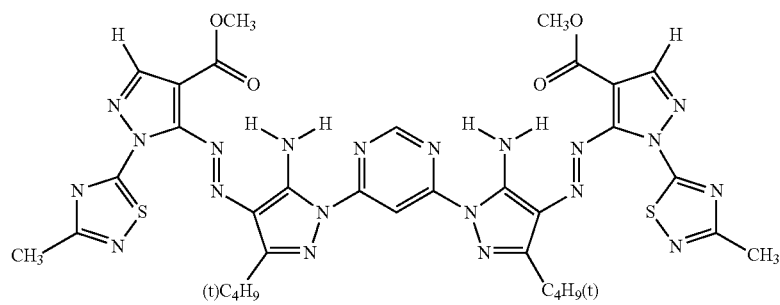
Figure 40:
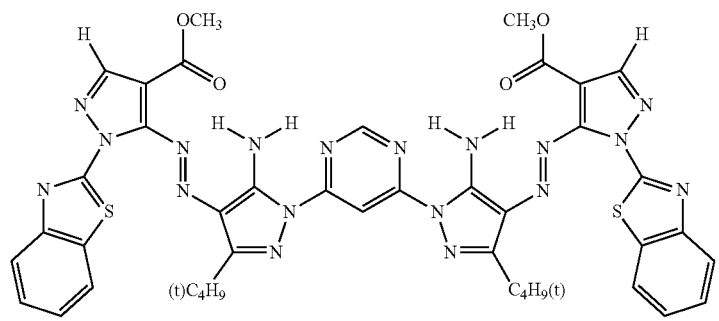
Figure 41:
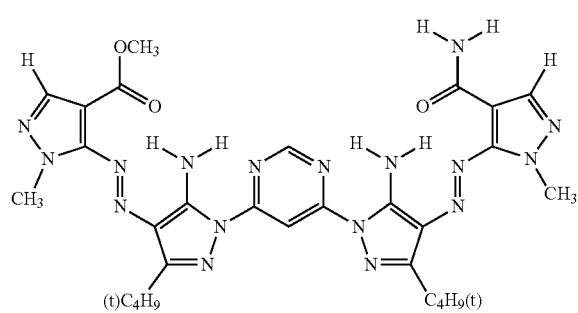
Figure 42:
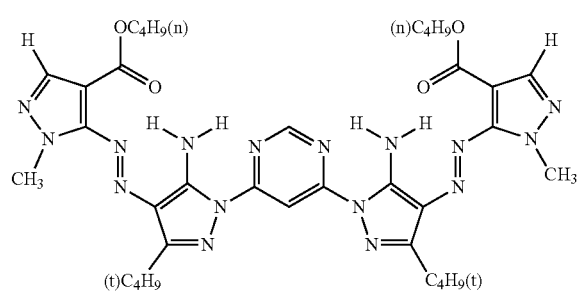
Figure 43:
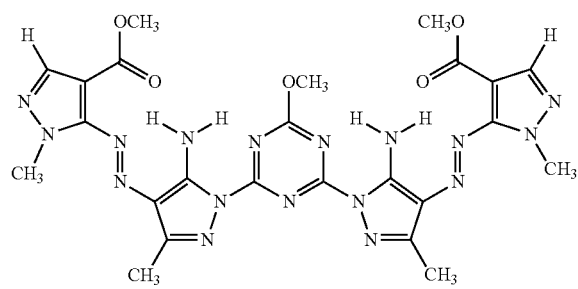
Figure 44:
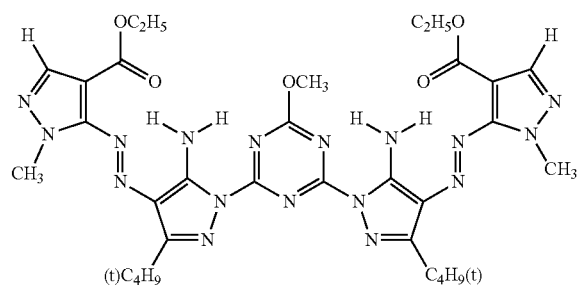

9 Claims, No Drawings ent of the present invention is a radiation-curable ink composition for inkjet recording, the ink composition for inkjet recording, inkjet recording method, and printed matter

RADIATION-CURABLE INK COMPOSITION FOR INKJET RECORDING, INKJET RECORDING METHOD, AND PRINTED MATTER

CROSS-REFERENCE TO RELATED APPLICATION

This application claims priority under 35 USC 119 from Japanese Patent Application No. 2009-046568 filed on Feb. 27, 2009, the disclosure of which is incorporated by reference herein.

BACKGROUND OF THE INVENTION

1. Field of the Invention

The present invention relates to a radiation-curable ink composition for inkjet recording, an inkjet recording method using the ink composition, and a printed matter obtained by using the ink composition.

2. Related Art

Inkjet recording enables to form an image with simple and inexpensive manner. Inkjet recording has excellent applicability to printing on a recording medium with an irregular surface shape since it performs ejection of an ink from a nozzle which does not contact with a recording medium.

Limited kinds of recording media and costs accompanied therewith have been concerned with respect to inkjet recording, that requires exclusive paper as the recording media. There have been many attempts to print on a transferred medium which is different from the exclusive paper by the inkjet recording.

Attention has been recently focused on a solventless inkjet recording method which includes forming an image using a radiation-curable inkjet recording ink, which is an ink which can be cured by being irradiated with radiant rays such as ultraviolet rays, by ink-jetting and then irradiating the image with radiant rays such as ultraviolet rays to cure the ink.

In general, as compared to a water-based ink which contains water as a diluent and a solvent-type ink which contains an organic solvent as the diluent, an inkjet recording method based on a radiation-curable ink has merits such as wider application range of base materials due to its ability to print on non-absorbable base materials such as glass, metal, or plastic base materials, superior rub resistance and solvent resistance of an image formed thereby, higher sensitivity, higher productivity, or smaller affection on the human body or the environment due to smell or the like because a volatile solvent is not contained therein. Therefore, application of the inkjet recording method using the radiation-curable ink in industrial fields has been expected.

A radical polymerizable ultraviolet curable (UV-curable) ink, which contains an acrylic composition as its main component, and a cationic polymerizable UV-curable ink are known as the ink for inkjet recording of the radiation-curable ink. Unlike the radical polymerizable UV-curable ink, the cationic polymerizable-UV-curable ink is unaffected by inhibitory effect by oxygen. Therefore, the cationic polymerizable-ultraviolet curable ink has merits of high sensitivity and excellent productivity.

SUMMARY OF THE INVENTION

In this regard, for example, Japanese Patent Application Laid-Open (JP-A) No. 2008-207425 describes a cationic UV-curable ink composition for inkjet recording which contains C.I. Pigment Yellow 150 as a yellow pigment and a polymer dispersant, and states that the ink, which suppresses generation of foreign matters even when an inkjet recording apparatus having an electrical conductivity member which contacts a radiation-curable inkjet ink is used therewith, is excellent in ejection stability.

However, an image obtained using the UV-curable yellow color ink for inkjet recording described in JP-A No. 2008-207425 may have unevenness in density and streak-like unevenness and may not be satisfactory when the ink is used in a system in which a electrical conductivity member does not contact with the ink after the ink is subjected to a long-term storage or after aging at high temperatures.

The present invention provides a cationic polymerizable radiation-curable ink composition for inkjet recording which may have excellent ejection stability after long-term storage and/or after aging at high temperatures. The present invention further provides an inkjet recording method which uses the ink composition and may reduce the unevenness in density and streak-like unevenness by decreasing variations in volumes of ejected ink droplets and reducing gaps between target landing positions and landed positions of the ejected ink. The present invention further provides a printed matter obtained by the inkjet recording method.

Specifically, one aspect of the present invention is a radiation-curable ink composition for inkjet recording, the ink composition comprising: an azo compound represented by Formula (1), a tautomer of the azo compound, a salt of the azo compound, a salt of the tautomer, a hydrate of the azo compound, a hydrate of the tautomer, or any combination thereof; a polymer dispersant; a cationic polymerizable compound; and a cationic polymerization initiator.

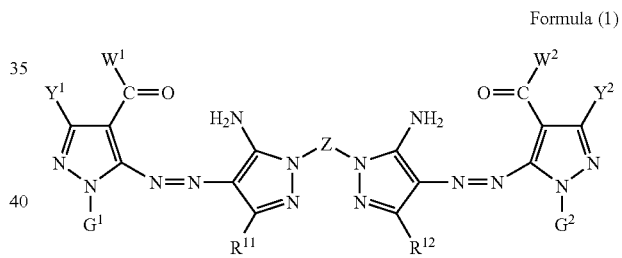

Formula (1)

In Formula (1), Z represents a divalent group having a 5- to 8-membered nitrogen-containing heterocycle; $Y^1$, $Y^2$, $R^{11}$ and $R^{12}$ each independently represent a hydrogen atom or a substituent; $G^1$ and $G^2$ each independently represent a hydrogen atom, an alkyl group, a cycloalkyl group, an aralkyl group, an alkenyl group, an alkynyl group, an aryl group or a heterocyclic group; and $W^1$ and $W^2$ each independently represent an alkoxy group, an amino group, an alkyl group, or an aryl group.

Another aspect of the present invention is an inkjet recording method comprising: ejecting the ink composition onto a recording medium; and curing the ejected ink composition by irradiating the ejected ink composition with active radiation.

Still another aspect of the present invention is a printed matter formed by the inkjet recording method. Specifically, the printed matter comprises, on a recording medium, an image formed from the radiation-curable ink composition for inkjet recording which is ejected onto the recording medium and cured by being irradiated with active radiation.

DETAILED DESCRIPTION OF THE INVENTION

The inventor of the invention has found out that a UV-curable yellow ink composition for inkjet recording which is excellent in ejection stability even after the long-term storage or after aging at high temperatures and may suppress density unevenness and streak-like unevenness may be obtained by employing, in the UV-curable ink yellow composition, an azo pigment having a carbonyl group which may form an intramolecular hydrogen bond with the carbon atom adjacent to the carbon atom to which an azo group is bonded.

The radiation-curable ink composition for inkjet recording of the invention contains at least (A) an azo compound represented by Formula (1), a tautomer of the azo compound, a salt of the azo compound, a salt of the tautomer, a hydrate of the azo compound, a hydrate of the tautomer, or any combination thereof, (B) a polymer dispersant, (C) a cationic polymerizable compound, and (D) a cationic polymerization initiator.

(A) Azo Pigment

The azo pigment to be used in the invention is typically a compound represented by Formula (1). The azo pigment may be selected from the group consisting of a compound having the structure represented Formula (1), a tautomer of the azo compound, a salt of the azo compound, a salt of the tautomer, a hydrate of the azo compound, a hydrate of the tautomer, and any combination thereof.

The pigment molecule of the compound represented by Formula (1) easily causes intramolecular or intermolecular interaction due to its specific structure. Since the compound has a low solubility in water or organic solvents, it may be used as the preferable azo pigment in exemplary embodiments of the invention.

The pigment is used by being finely-dispersed, as a solid particle such as a molecular aggregate, in a medium, and is different from a dye used by being dissolved in water or an organic solvent to be in a molecular dispersion state.

Formula (1)

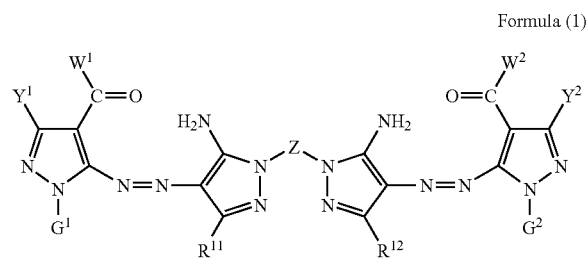

In Formula (1), Z represents a divalent group having a 5- to 8-membered nitrogen-containing heterocycle; $Y^1$, $Y^2$, $R^{11}$ and $R^{12}$ each independently represent a hydrogen atom or a substituent; $G^1$ and $G^2$ each independently represent a hydrogen atom, an alkyl group, a cycloalkyl group, an aralkyl group, an alkenyl group, an alkynyl group, an aryl group or a heterocyclic group; and $W^1$ and $W^2$ each independently represent an alkoxy group, an amino group, an alkyl group, or an aryl group.

In Formula (1), Z represents a divalent group having a 5- to 8-membered nitrogen-containing heterocycle. Preferable examples of the nitrogen-containing heterocycle, each of which may have one or more substituent at any position(s) thereof, include a pyrrole ring, a pyrazole ring, a triazole ring, an imidazole ring, a thiazole ring, an isothiazole ring, an oxazole ring, an isoxazole ring, a thiadiazole ring, a thiophene ring, a furan ring, a pyridine ring, a pyrimidine ring, a triazine ring, and a pyridazine ring. More preferable examples include a 6-membered nitrogen-containing heterocycle such as a pyridine ring, a pyrimidine ring, or an s-triazine ring. Particularly preferable examples of Z include a divalent group having a pyrimidine ring.

When Z is a divalent group having a 6-membered nitrogen-containing heterocycle, the intramolecular and intermolecular interactions of pigment molecules may be more easily improved from the viewpoint of hydrogen bonding and planarity of the molecules.

In embodiments, the divalent group having a 5- to 8-membered nitrogen-containing heterocycle represented by Z may be condensed.

In Formula (1), $Y^1$ and $Y^2$ each independently represent a hydrogen atom or a substituent. Examples of the substituent include a halogen atom, an alkyl group, an aralkyl group, an alkenyl group, an alkynyl group, an aryl group, a heterocyclic group, a cyano group, a hydroxy group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group, and a silyl group.

Herein, an "alkyl group" may be a straight chain alkyl group, a branched alkyl group, or a cyclic alkyl group, and may be a substituted- or unsubstituted-alkyl group. The scope of an alkyl group encompass a cycloalkyl group, a bicycloalkyl group, and those having many ring structures such as a tricyclo structure. An alkyl group contained in a substituent (such as an alkyl group of an alkoxy group, an alkyl group of an alkylcarbonyl group or an alkyl group of an alkylsulfonyl group) also has this definition.

Preferable examples of $Y^1$ and $Y^2$ include a hydrogen atom, an alkyl group (such as a methyl group), an aryl group (such as a phenyl group), a heterocyclic group (such as a 2-pyridyl group), and an alkylthio group (such as a methylthio group), more preferable examples thereof include a hydrogen atom, a methyl group, a phenyl group, and a methylthio group, and particularly preferable examples thereof include a hydrogen atom. $Y^1$ and $Y^2$ may represent the same groups or groups which are different from each other.

In Formula (1), $R^{11}$ and $R^{12}$ each independently represent a hydrogen atom or a substituent. Examples of the substituent represented by $R^{11}$ and $R^{12}$ include a straight chain or branched alkyl group having from 1 to 12 carbon atoms such as methyl, ethyl, n-propyl, propyl, n-butyl, i-butyl, sec-butyl, t-butyl, 2-ethylhexyl, 2-methylsulfonylethyl, 3-phenoxypropyl, or trifluoromethyl; a straight chain or branched aralkyl group having from 7 to 18 carbon atoms such as a benzyl group; a straight chain or branched alkenyl group of having from 2 to 12 carbon atoms such as a vinyl group; a straight chain or branched alkynyl group having from 2 to 12 carbon atoms such as an ethynyl group; a straight chain or branched cycloalkyl group having from 3 to 12 carbon atoms such as a cyclopentyl group; a straight chain or branched cycloalkenyl group having from 3 to 12 carbon atoms such as a cyclopentenyl group; a halogen atom such as a chlorine atom or a bromine atom; an aryl group such as phenyl, 4-t-butylphenyl, or 2,4-di-t-amylphenyl; a heterocyclic group such as imidazolyl, pyrazolyl, triazolyl, 2-furyl, 2-thienyl, 2-pyrimidinyl, or 2-benzothiazolyl; a cyano group; a hydroxy group; a nitro group; a carboxy group; an amino group; an alkyloxy group such as methoxy, ethoxy, 2-methoxyethoxy, or 2-methylsulfonylethoxy; an acyloxy group such as phenoxy, 2-methylphenoxy, 4-t-butylphenoxy, 3-nitrophenoxy, 3-t-butyloxycarbonylphenoxy, or 3-methoxycarbonylphenyloxy; an acylamino group such as acetamido, benzamido, or 4-(3-t-butyl-4-hydroxyphenoxy)butaneamido; an alkylamino group such as methylamino, butylamino, diethylamino, or methylbutylamino; an arylamino group such as phenylamino or 2-chloroanilino; a ureido group such as phenylureido, methylureido, or N,N-dibutylureido; a sulfamoylamino group such as N,N-dipropylsulfamoylamino; an alkylthio group such as methylthio, octylthio, or 2-phenoxyethylthio), an arylthio group such as phenylthio, 2-butoxy-5-t-octylphenylthio, or 2-carboxyphenylthio; an alkyloxycarbonylamino group such as methoxycarbonylamino; an alkylsulfonylamino group and an arylsulfonylamino group such as methylsulfonylamino, phenylsulfonylamino, or p-toluenesulfonylamino; a carbamoyl group such as N-ethylcarbamoyl or N,N-dibutylcarbamoyl; a sulfamoyl group such as N-ethylsulfamoyl, N,N-dipropylsulfamoyl, or N-phenylsulfamoyl; a sulfonyl group such as methylsulfonyl, octylsulfonyl, phenylsulfonyl, or p-toluenesulfonyl; an alkyloxycarbonyl group such as methoxycarbonyl or butyloxycarbonyl; a heterocyclic oxy group such as 1-phenyltetrazole-5-oxy or 2-tetrahydropyranyloxy; an azo group such as phenylazo, 4-methoxyphenylazo, 4-pivaloylaminophenylazo, or 2-hydroxy-4-propanoylphenylazo; an acyloxy group such as acetoxy; a carbamoyloxy group such as N-methylcarbamoyloxy or N-phenylcarbamoyloxy; a silyloxy group such as trimethylsilyloxy or dibutylmethylsilyloxy; an aryloxycarbonylamino group such as phenoxycarbonylamino; an imido group such as N-succinimido or N-phthalimido; a heterocyclic thio group such as 2-benzothiazolylthio, 2,4-di-phenoxy-1,3,5-triazole 6-thio, or 2-pyridylthio; a sulfinyl group such as 3-phenoxypropylsulfinyl; a phosphonyl group such as phenoxyphosphonyl, octyloxyphosphonyl, or phenylphosphonyl; an aryloxycarbonyl group such as phenoxycarbonyl; an acyl group such as acetyl, 3-phenylpropanoyl, or benzoyl; and an ionic hydrophilic group such as a carboxy group, a sulfo group, a phosphono group or a quaternary ammonium group.

Preferable examples of $R^{11}$ and $R^{12}$ in Formula (1) include a substituted or unsubstituted acylamino group having from 1 to 8 carbon atoms, a substituted or unsubstituted alkyl group having from 1 to 12 carbon atoms, a substituted or unsubstituted aryl group having from 6 to 18 carbon atoms, and a substituted or unsubstituted heterocyclic group having from 4 to 12 carbon atoms, more preferable examples thereof include a straight chain or branched alkyl group having from 1 to 8 carbon atoms, and even more preferable examples thereof include a methyl group and a t-butyl group, and particularly preferable examples thereof include a t-butyl group. $R^{11}$ and $R^{12}$ may represent the same groups or groups which are different from each other.

$G^1$ and $G^2$ each independently represent a hydrogen atom, an alkyl group, a cycloalkyl group, an aralkyl group, an alkenyl group, an alkynyl group, an aryl group, or a heterocyclic group. Preferable examples of $G^1$ and $G^2$ include a hydrogen atom, a methyl group, an ethyl group, a n-propyl group, an i-propyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, and a pyrazinyl group. More preferable examples thereof include a hydrogen atom, a methyl group, a phenyl group, a pyridyl group, a pyrimidinyl group, a pyrazinyl group. Particularly preferable examples among these include a methyl group, a 2-pyridyl group, a 2,6-pyrimidinyl group, and a 2,5-pyrazinyl group.

The alkyl group represented by $G^1$ or $G^2$ preferably has 5 or fewer carbon atoms, more preferably has 3 or fewer carbon atoms, and is particularly preferably a methyl group. $G^1$ and $G^2$ may represent the same groups or groups which are different from each other.

$W^1$ and $W^2$ each independently represent an alkoxy group, an amino group, an arylamino group pr a heterocyclic amino group.

Preferable examples of the alkoxy group represented by $W^1$ or $W^2$ include a substituted or unsubstituted alkoxy group having from 1 to 30 carbon atoms such as a methoxy group, an ethoxy group, an i-propoxy group, a t-butoxy group, an n-octyloxy group, or a 2-methoxyethoxy group.

Examples of the amino group represented by $W^1$ or $W^2$ include an alkylamino group, an arylamino group, and a heterocyclic amino group. Preferable examples thereof include an amino group, a substituted or unsubstituted alkylamino group having from 1 to 30 carbon atoms, a substituted or unsubstituted anilino group having from 6 to 30 carbon atoms, and specific examples thereof include a methylamino group, a dimethylamino group, an anilino group, an N-methyl-anilino group, and a diphenylamino group.

When $W^1$ or $W^2$ represents an alkyl group, the alkyl group may be a straight chain alkyl group, a branched alkyl group, or a cyclic alkyl group, and may be a substituted- or unsubstituted-alkyl group. The scope of the alkyl group encompass a cycloalkyl group, a bicycloalkyl group, and those having many ring structures such as a tricyclo structure.

Preferable examples of the alkyl group include an alkyl group having from 1 to 30 carbon atoms such as a methyl group, an ethyl group, an n-propyl group, an i-propyl group, a t-butyl group, an n-octyl group, an eicosyl group, a 2-chloroethyl group, a 2-cyanoethyl group, or a 2-ethylhexyl group. Preferable examples of the cycloalkyl group include a substituted or unsubstituted cycloalkyl group having from 3 to 30 carbon atoms such as a cyclohexyl group, a cyclopentyl group, or a 4-n-dodecylcyclohexyl group. Preferable examples of the bicycloalkyl group include a substituted or unsubstituted bicycloalkyl group having from 5 to 30 carbon atoms, namely, a monovalent group in which a hydrogen atom is removed from bicycloalkane having from 5 to 30 carbon atoms, and specific examples thereof include a bicyclo[1.2.2]heptan-2-yl group and a bicyclo[2.2.2]octan-3-yl group.

Preferable examples of the aryl group represented by $W^1$ or $W^2$ include a substituted or unsubstituted aryl group having from 6 to 30 carbon atoms such as a phenyl group, a p-tolyl group, a naphthyl group, an m-chlorophenyl group, or an o-hexadecanoylaminophenyl group.

In preferable embodiments, $W^1$ and $W^2$ each independently represent an alkoxy group, an amino group or an alkyl group. In more preferable embodiments, $W^1$ and $W^2$ each independently represent an alkoxy group or an amino group. In still more preferable embodiments, $W^1$ and $W^2$ each independently represent an alkoxy group having 5 or fewer carbon atoms, an amino group ($-NH_2$), or an alkylamino group having 5 or fewer carbon atoms. In further preferable embodiments, $W^1$ and $W^2$ each independently represent an alkoxy group having 3 or fewer carbon atoms, an amino group, or an alkylamino group having 3 or fewer carbon atoms. In particularly preferable embodiments, $W^1$ and $W^2$ each independently represent a methoxy group.

When $W^1$ and $W^2$ each independently represent an alkoxy group having 5 or fewer carbon atoms, an amino group ($-NH_2$), or an alkylamino group having 5 or fewer carbon atoms, a pigment molecule easily forms a stronger hydrogen bond in the molecule and/or between the molecules, which is preferable from the viewpoints of a good hue and high fastness (for example, fastness against light, gas, heat, water, or chemicals).

$W^1$ and $W^2$ may represent the same groups or groups which are different from each other.

In embodiments, Z, $Y^1$, $Y^2$, $R^{11}$, $R^{12}$, $G^1$, $G^2$, $W^1$ and $W^2$ may each independently have a substituent. Examples of the substituent include a halogen atom, an alkyl group, an aralkyl group, an alkenyl group, an alkynyl group, an aryl group, a heterocyclic group, a cyano group, a hydroxy group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group, and a silyl group.

The scope of the azo pigment used in the invention includes a tautomer of the azo compound represented by Formula (1). Formula (1) is shown as canonical structures among several tautomers with chemically acceptable structures. Tautomers having a structure other than the explicitly shown one may also be used in the invention. In embodiments, the azo pigment may be a mixture containing a plurality of such tautomers.

Examples of the azo pigment include a compound represented by the following Formula (1'), which is an azo-hydrazone tautomer of the compound represented by Formula (1). The use of the compound represented by Formula (1'), which is a tautomer of the azo compound represented by Formula (1), is included in the scope of the invention.

preferable embodiments, all substituents of the compound represented by Formula (1) are selected from the above-described preferable groups.

Particularly preferable examples of the azo compound represented by Formula (1) include those satisfying at least one of the following (1) to (5).

(1) $W^1$ and $W^2$ are each independently an alkoxy group (such as a methoxy group, an ethoxy group, an i-propoxy group, or a t-butoxy group), an amino group (such as an $-NH_2$ group, a methylamino group, a dimethylamino group, or an anilino group), an alkyl group (such as a methyl group, an ethyl group, an n-propyl group, an i-propyl group, a t-butyl group, or a cyclopropyl group) or an aryl group (such as a phenyl group, a p-tolyl group, or a naphthyl group). In preferable embodiments, $W^1$ and $W^2$ are each independently an alkoxy group, an amino group, or an alkyl group. In more preferable embodiments, $W^1$ and $W^2$ are each independently an alkoxy group or an amino group. In still more preferable embodiments, $W^1$ and $W^2$ are each independently an alkoxy group having 5 or fewer carbon atoms, an amino group (an $-NH_2$ group), or an alkylamino group having 5 or fewer carbon atoms. In particularly preferable embodiments, $W^1$ and $W^2$ are each independently an alkoxy group having 3 or fewer carbon atoms, an amino group (an $-NH_2$ group), or an alkylamino group having 3 or fewer carbon atoms. In specifically preferable embodiments, $W^1$ and $W^2$ are each independently a methoxy group (an $-OCH_3$ group).

(2) $R^{11}$ and $R^{12}$ are each independently a hydrogen atom or a substituent (such as a substituted or unsubstituted acylamino group having from 1 to 8 carbon atoms, a substituted or unsubstituted alkyl group having from 1 to 12 carbon atoms, a substituted or unsubstituted aryl group having from 6 to 18 carbon atoms, or a substituted or unsubstituted heterocyclic group having from 4 to 12 carbon atoms). In preferable embodiments, $R^{11}$ and $R^{12}$ are each independently a straight chain or branched alkyl group having from 1 to 8 carbon atoms. In more preferable embodiments, $R^{11}$ and $R^{12}$ are each independently a methyl group, an i-propyl group, or a t-butyl group. In particularly preferable embodiments, $R^{11}$ and $R^{12}$ are each independently a t-butyl group.

(3) Z represents a divalent group having a 5- to 8-membered heterocyclic ring and may be condensed. In preferable embodiments, Z is a 5- or 6-membered substituted or unsubstituted nitrogen-containing heterocyclic group such as a pyr-

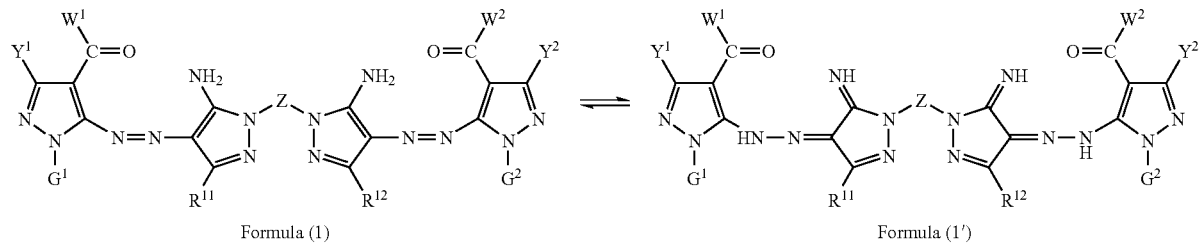

Formula (1)  Formula (1')

$R^{11}$, $R^{12}$, $W^1$, $W^2$, $Y^1$, $Y^2$, $G^1$, $G^2$, and Z in Formula (1') respectively have the same definition as corresponding $R^{11}$, $R^{12}$, $W^1$, $W^2$, $Y^1$, $Y^2$, $G^1$, $G^2$, and Z in Formula (1).

In preferable embodiments, at least one of various substituents of the compound represented by Formula (1) is selected from the above-described preferable groups. The larger the number of substituents selected from the above-described preferable groups is, the more preferable it is. In particularly role ring, a pyrazole ring, a trirazole ring, an imidazole ring, a thiazole ring, an isothiazole ring, an oxazole ring, an isoxazole ring, a thiadiazole ring, a thiophene ring, a furan ring, a pyridine ring, a pyrimidine ring, a triazine ring, or a pyridazine ring. In more preferable embodiments, Z is a 6-membered nitrogen-containing heterocyclic group having from 3 to 10 carbon atoms. Preferable examples of the heterocycle include a pyridine ring, a pyrimidine ring, an s-triazine ring, a pyridazine ring, and a pyrazine ring. More preferable examples of the heterocycle include a pyridine ring, a pyrimidine ring, an s-triazine ring, a pyridazine ring, and a pyrazine ring. Further preferable examples of the heterocycle include a pyrimidine ring and an s-triazine ring. Particularly preferable examples of the heterocycle include a pyrimidine ring.

(4) $G^1$ and $G^2$ each independently represent a hydrogen atom, an alkyl group, a cycloalkyl group, an aralkyl group, an alkenyl group, an alkynyl group, an aryl group, or a heterocyclic group. In preferable embodiments, $G^1$ and $G^2$ each independently represent a hydrogen atom, a methyl group, an ethyl group, a n-propyl group, an i-propyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, or a pyrazinyl group. In more preferable embodiments, $G^1$ and $G^2$ each independently represent a hydrogen atom, a methyl group, a phenyl group, a pyridyl group, a pyrimidinyl group, or a pyrazinyl group. In particularly preferable embodiments, $G^1$ and $G^2$ each independently represent a methyl group, a 2-pyridyl group, a 2,6-pyrimidinyl group, or a 2,5-pyrazinyl group.

The alkyl group represented by $G^1$ or $G^2$ preferably has 5 or fewer carbon atoms, more preferably has 3 or fewer carbon atoms, and is particularly preferably a methyl group.

(5) $Y^1$ and $Y^2$ each independently represent a hydrogen atom, an alkyl group (such as a methyl group), an ryl group (such as a phenyl group), a heterocyclic group (such as a 2-pyridyl group), or an alkylthio group (such as a methylthio group). In preferable embodiments, $Y^1$ and $Y^2$ each independently represent a hydrogen atom, a methyl group, a phenyl group, or a methylthio group. In more preferable embodiments, $Y^1$ and $Y^2$ each independently represent a hydrogen atom.

Preferable examples of the azo compound represented by Formula (1) include the azo compound represented by the following Formula (2).

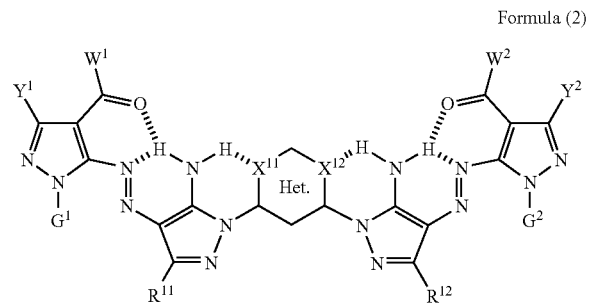

Formula (2)

$G^1$, $G^2$, $R^{11}$, $R^{12}$, $W^1$, $W^2$, $Y^1$ and $Y^2$ in Formula (2) respectively have the same definition as that of corresponding $G^1$, $G^2$, $R^{11}$, $R^{12}$, $W^1$, $W^2$, $Y^1$ and $Y^2$ in Formula (1).

$X_{11}$ and $X_{12}$ each independently represent a heteroatom in a divalent group (Het.) having a nitrogen-containing heterocycle represented by Z in Formula (4).

There are a lot of tautomers of the azo compound represented by Formula (1) and employable in the invention.

In preferable embodiments, the azo compound represented by Formula (1) may have a substituent which forms an intramolecular hydrogen bond or an intramolecular cross hydrogen bond. It is preferable that the azo compound represented by Formula (1) has at least one of the substituent which forms an intramolecular cross hydrogen bond. It is more preferable that the azo pigment has at least three of the substituent which forms an intramolecular hydrogen bond. It is particularly preferable that the azo pigment has at least three of the substituent which forms an intramolecular hydrogen bond and at least two of the hydrogen bonds form an intramolecular cross hydrogen bond.

The reason why the azo compound represented by Formula (2) is preferable may be that, in the structure Formula (2), a nitrogen atom which forms a heterocyclic group, a hydrogen atom, and a heteroatom (a nitrogen atom of an azo group or its tautomer, i.e., hydrazone group, an oxygen atom of a carbonyl group or a nitrogen atom of an amino group) contained in an azo pigment structure easily form at least one intramolecular cross hydrogen bond (intramolecular hydrogen bond).

Further preferably, as shown in Formula (2), a nitrogen atom which forms a heterocyclic group, a hydrogen atom of an amino group, and a heteroatom (for example, a nitrogen atom of an azo group or its tautomer, i.e., hydrazone group, an oxygen atom of a carbonyl group or a nitrogen atom of an amino group) contained in an azo pigment structure easily form at least four intramolecular hydrogen bonds and easily form at least two intramolecular cross hydrogen bonds.

As a result, the planarity of the molecules is improved and intramolecular and intermolecular interactions are improved. For example, the crystallinity of the azo compound represented by Formula (2) becomes high (namely, the azo pigment becomes to easily form a higher order structure), so that performances required to the pigment such as lightfastness, thermal stability, wet heat stability, waterproof properties, gas resistance or solvent resistance may be significantly improved.

An isotope (such as $^2$H, $^3$H, $^{13}$C, or $^{15}$N) may be contained in the compound represented by Formula (1).

Hereinafter, Pig.-1 to Pig.-46 will be exemplified as specific examples of the azo pigments represented by Formula (1). However, the azo pigment to be used in the invention is not limited thereto. The structures of the following specific examples are respectively shown as a canonical structure among several tautomers with chemically acceptable structures, although the azo pigment may have a structure of any one of tautomers thereof.

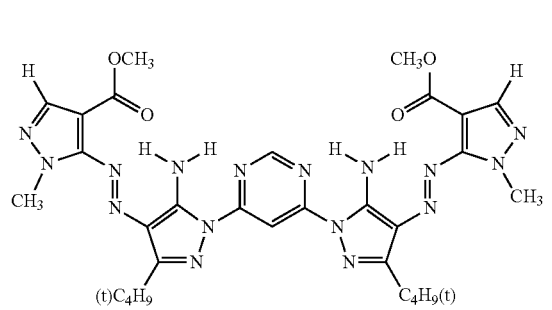

Pig.-1

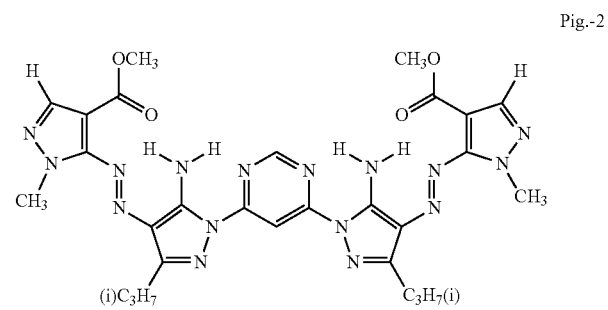

Pig.-2

-continued
Fig.-11
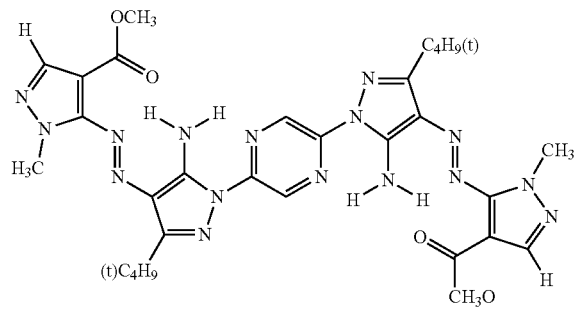
Fig.-12
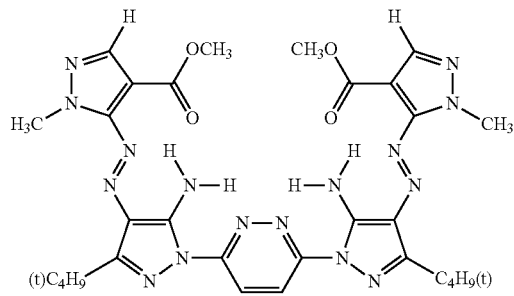
Fig.-13
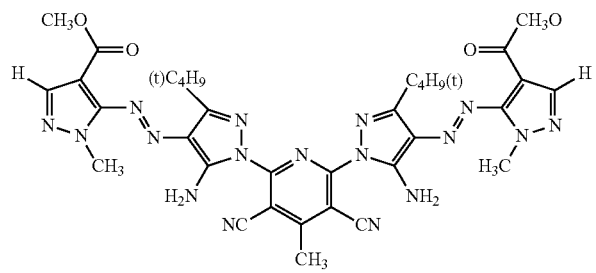
Fig.-14
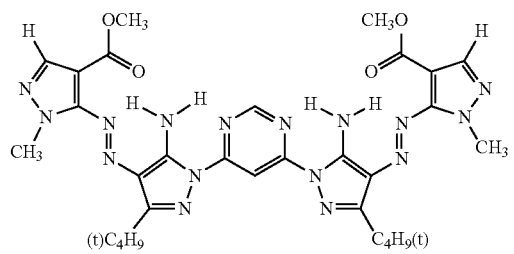
Fig.-15
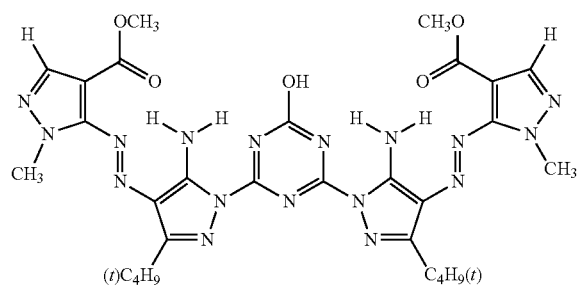
Fig.-16
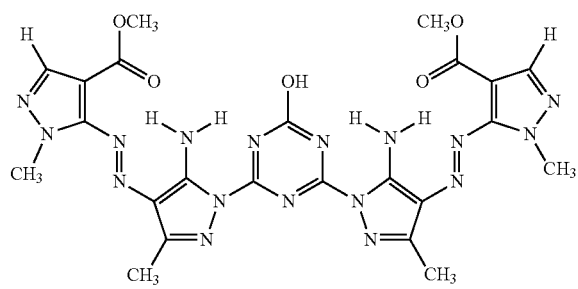
Fig.-17
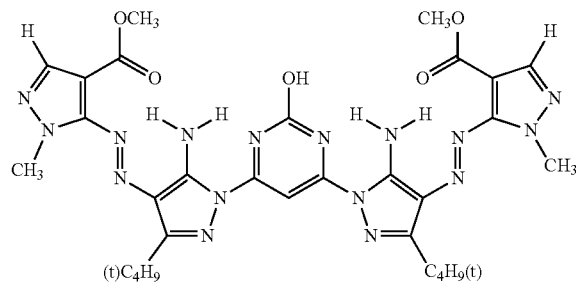
Fig.-18
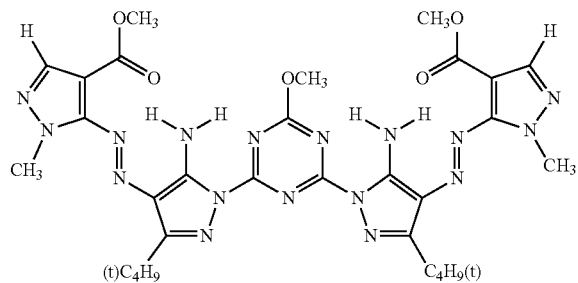
Fig.-19
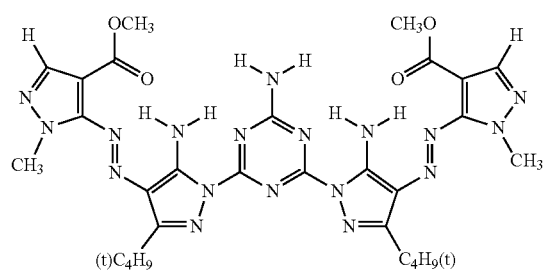
Fig.-20

-continued
Pig.-29
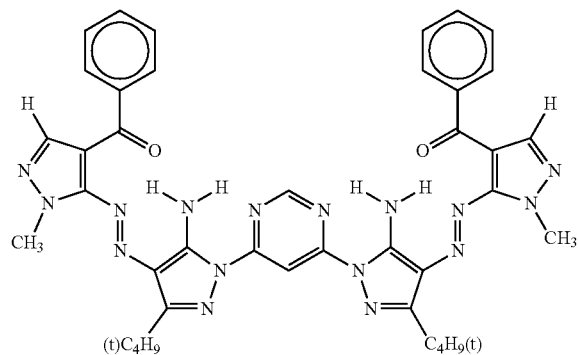
Pig.-30
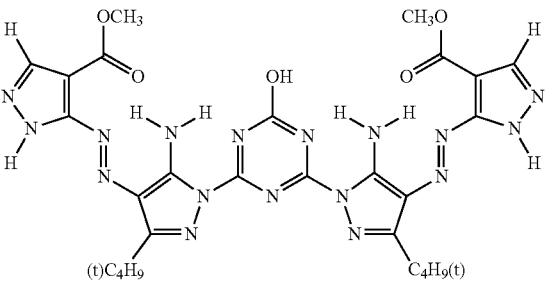
Pig.-31
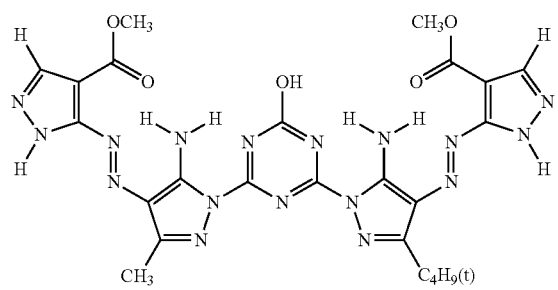
Pig.-32
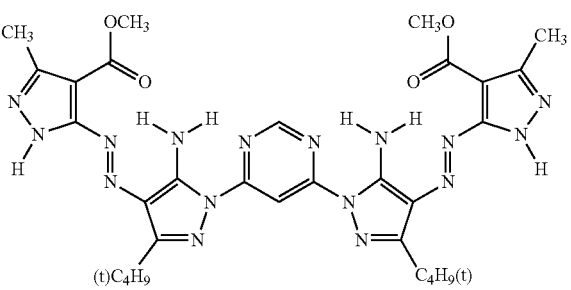
Pig.-33
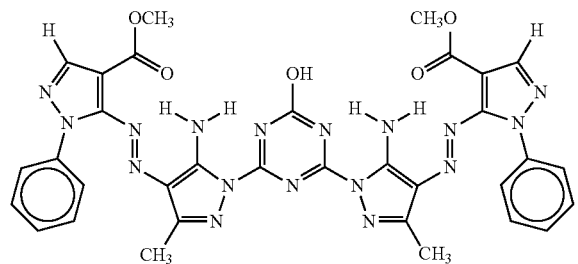
Pig.-34
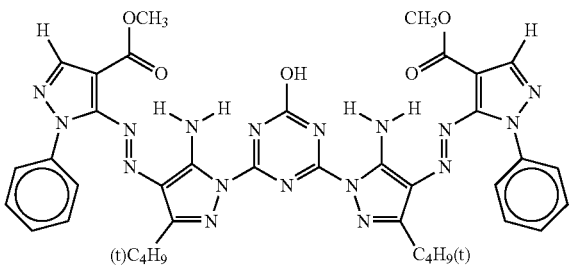
Pig.-35
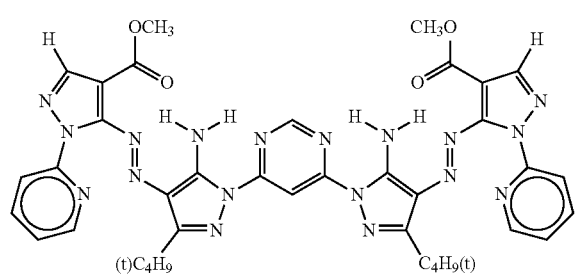
Pig.-36
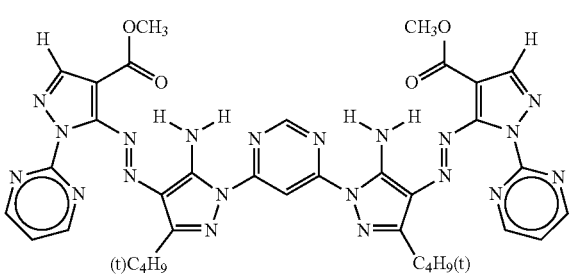
Pig.-37
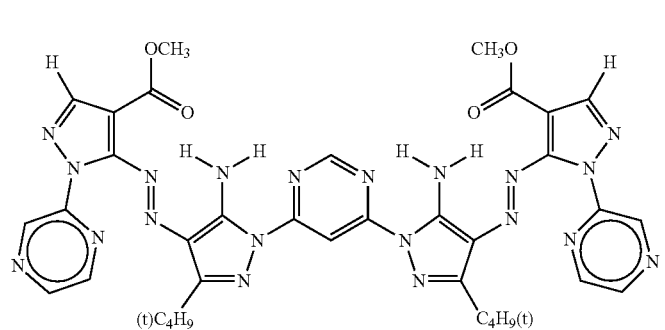

-continued

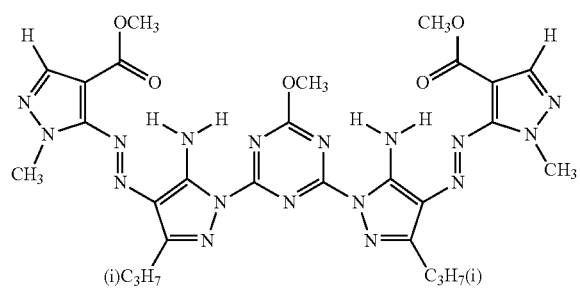

Pig.-45

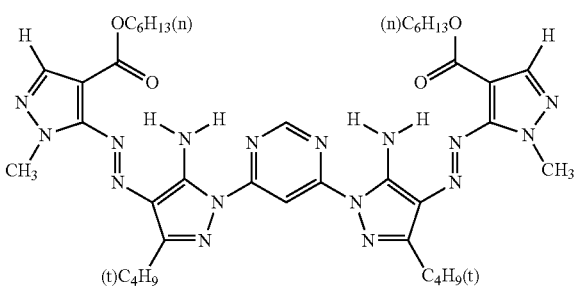

Pig.-46

There is no particular limitation to the azo compound represented by Formula (1) as long as its chemical structure is that of Formula (1) or that of any one of tautomers thereof. There is also no particular limitation to a crystalline form thereof. The pigment may have any crystalline form, and examples thereof include a so-called polymorph (crystalline polymorph).

The "crystalline polymorph" of one compound is a crystal which has the same composition as the compound, but whose arrangement of building block (molecule or ion) in the crystal is different from that in the compound. Chemical and physical properties of the crystalline polymorph may be determined by its crystal structure. Prulal crystalline polymorphs may be distinguished from each other according to rheology, hue, and other color characteristics. Difference in prulal crystalline polymorphs may be confirmed by X-Ray Diffraction (powder X-ray diffraction measurement result) or X-Ray Analysis (X-ray crystal structure analysis result).

When the azo compound represented by Formula (1) in the invention has a crystalline polymorph, the crystal form may be that of any polymorphs thereof, and may be a mixture of two or more polymorphism although it is preferable that the azo pigment has a single crystalline polymorph as a main component. That is, it is preferable that the azo pigment has smaller contamination with crystalline polymorph. The content of the azo pigment having a single crystal form is typically from 70% to 100%, preferably from 80% to 100%, more preferably from 90% to 100%, further preferably from 95% to 100%, and particularly preferably 100% based on the total amount of the azo pigment.

When the azo pigment contains, as a main component, a compound having a single crystal form, the regularity for the arrangement of pigment molecules may be improved and the intramolecular and intermolecular interactions may be enhanced. Thus, a high level three-dimensional network is easily formed. As a result, performances required for the pigment such as improvement in the hue, lightfastness, heat fastness, humidity fastness, oxidizing gas fastness, or solvent resistance may be improved.

The content of the crystalline polymorph based on a total amount of the azo pigment may be confirmed by the value of the solid which is physicochemically measured by Single crystal X-ray crystal structure analysis, Powder X diffraction (XRD), Micrograph (TEM) of crystal, or IR (KBr method).

In the invention, when the azo compound represented by Formula (1) has acid groups, a part or all of the acid groups may be in a form of salt, or a salt-form pigment and a free acid-form pigment may be present as a mixture. Examples of the form of salt include a salt of alkali metals such as Na, Li, or K; a salt of ammonium which may be substituted by an alkyl group or a hydroxyalkyl group; and a salt of organic amine. Examples of the organic amine include lower alkylamine, hydroxy-substituted lower alkylamine, carboxy-substituted lower alkylamine, and polyamine having from 2 to 10 alkyleneimine units, each of the units having from 2 to 4 carbon atoms. Either a pigment of a single salt-form or pigments of prulal salt-forms may be present in the azo pigment.

When a plurality of acid groups are included in one molecule of the azo pigment used in the invention, the plurality of acid groups may be independently a salt form or an acid form, and may be different from each other.

In the invention, the azo pigment a hydrate of the azo compound represented by Formula (1) and containing water molecules in the crystal. The number of water molecules in the crystal is not particularly limited.

Examples of the production method of the azo compound represented by Formula (1) include a method in which a heterocyclic amine represented by Formula (A) described below is diazotized under acid condition; the resulting product is subjected to coupling reaction with the compound represented by the following Formula (B); and the resulting product is subjected to post-treatment in a conventional manner to produce the azo compound represented by Formula (1).

Formula (A)

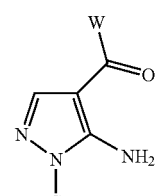

Formula (B)

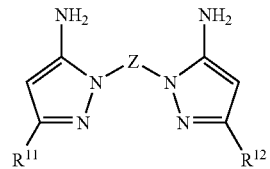

In Formulae (A) and (B), W has the same definition as that of $W^1$ or $W^2$ in Formula (1); G has the same definition as that of $G^1$ or $G^2$ in Formula (1); and $R^{11}$, $R^{12}$ and Z respectively has the same definition as that of corresponding $R^{11}$, $R^{12}$ and Z.

The heterocyclic amine represented by Formula (A) may be generally produced by a well-known and common used method (for example, the method described in Helv. Chim. Acta, 41, 1958, 1052-1056, and the method described in Helv. Chim. Acta, 42, 1959, 349-352; the disclosures of which are incorporated by reference herein), or any method which substantially accords with any of these.

The compound represented by Formula (B) may be produced by the methods described in WO 06/082669 or JP-A No. 2006-57076, or any method which substantially accords with any of these.

The diazotizing reaction of the heterocyclic amine represented by Formula (A) may be performed by allowing the heterocyclic amine to react with reagents such as sodium nitrite, nitrosylsulfuric acid, and isoamyl nitrite in an acidic solvent such as sulfuric acid, phosphoric acid, acetic acid, hydrochloric acid, or methanesulfonic acid at a temperature of 15° C. or lower for about 10 minutes to about 6 hours.

The coupling reaction may be carried out by reacting the diazonium salt obtained by the above-described method with the compound represented by Formula (B) at 40° C. or lower, preferably at 25° C. or lower, for about 10 minutes to about 12 hours.

Generally, a crystal is obtained by adding water or an alcohol solvent to the reaction liquid to precipitate the crystal and then performing filtration, although the crystal may have been precipitated in the reaction liquid in some cases. Alternatively, such a crystal is obtained by adding the reaction liquid to an alcohol solvent or water to precipitate the crystal and then performing filtration. The thus obtained may be further washed and dried if necessary to obtain the azo compound represented by Formula (1).

The azo compound represented by Formula (1) is obtained as a crude azo pigment by the above production method. In preferable embodiments, such a elude azo pigment is subjected to post-treatment for being employed in the invention. Examples of the post-treatment include: pigment particle regulation by milling such as solvent salt milling, salt milling, dry milling, solvent milling, or acid pasting, and/or by heating a solvent; and surface treatment of pigment particles with resins, surfactants, and/or dispersing agents.

In preferable embodiments, the azo compound represented by Formula (1) subjected to post-treatment by solvent heating treatment and/or solvent salt milling is used in the invention.

Examples of the solvent to be used for the solvent heating treatment include water; aromatic hydrocarbon solvents such as toluene and xylene; halogenated hydrocarbon solvents such as chlorobenzene or o-dichlorobenzene; alcohol solvents such as i-propanol or i-butanol; polar aprotic organic solvents such as N,N-dimethylformamide, N,N-dimethylacetamide, or N-methyl-2-pyrrolidone; glacial acetic acid, pyridine, and mixtures thereof. Organic or inorganic acids or bases may be further added to the above-described solvents. The temperature of solvent heating treatment varies depending on the primary particle diameter of the desired pigment. In preferable embodiments, the temperature is from 40° C. to 150° C., and in more preferable embodiments, the temperature is from 60° C. to 100° C. The time for the treatment is preferably from 30 minutes to 24 hours.

Examples of the solvent salt milling include a method including placing, into a kneading machine, a crude azo pigment, an inorganic salt, and an organic solvent in which the organic salt is insoluble, and performing kneading and grinding. A water-soluble inorganic salt may be suitably used as the inorganic salt. Preferable examples thereof include inorganic salts such as sodium chloride, potassium chloride or sodium sulfate. In preferable embodiments, the inorganic salt has an average particle diameter of 0.5 µm to 50 µm. The amount of the inorganic salt is preferably from 3 parts by mass to 20 parts by mass, and more preferably from 5 parts by mass to 15 parts by mass with respect to the crude azo pigment. A water-soluble organic solvent may be suitably used as the organic solvent. Since the solvent may easily evaporate due to the temperature rise at the time of kneading, a high-boiling-point solvent is preferable from a viewpoint of safety.

Examples of the organic solvent include diethylene glycol, glycerol, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, and mixtures thereof. The amount of the water-soluble organic solvent is preferably from 0.1 to 5 times of an amount of the crude azo pigment. The kneading temperature is preferably from 20° C. to 130° C., and particularly preferably from 40° C. to 110° C. Examples of the kneading machine include kneaders and mix maulers.

In preferable embodiments, pigments, dispersants, and media are selected and dispersion conditions and filtration conditions are set so that the average particle diameter of azo pigment particles represented by Formula (1) is in a range of from 0.005 µm to 0.5 µm, more preferably in a range of from 0.01 to µm 0.45 µm, further preferably in a range of from 0.015 µm to 0.4 µm.

The ink composition of the invention may contain at least one of the azo compound represented by Formula (1), a tautomer of the azo compound, a salt of the azo compound or the tautomer, and a hydrate of the azo compound or the tautomer. Two or more of them may be used in combination.

The content of the azo compound represented by Formula (1) and its tautomer, as well as salts and hydrates thereof is preferably in a range of from 0.1% by mass to 10% by mass, more preferably in a range of from 1% by mass to 7% by mass, and further preferably in a range of from 2% by mass to 5% by mass based on the total amount of the ink composition.

(B) Polymer Dispersant

The ink composition of the invention contains a polymer dispersant.

Mixing and dispersing the azo compound represented by Formula (1) is preferably carried out in the presence of the polymer dispersant.

The "polymer dispersant" herein means a dispersant having a weight-average molecular weight of 1,000 or more. The weight-average molecular weight of the polymer dispersant is preferably from 2,000 to 300,000, more preferably from 3,000 to 200,000, further preferably from 4,000 to 100,000, and particularly preferably from 5,000 to 100,000. When the weight-average molecular weight of the polymer dispersant is within such range, dispersability of pigments in the ink composition may be improved to result in excellent storage stability and ejection property of the ink composition.

A main chain skeleton of the polymer dispersant is not particularly limited. Examples of the main chain skeleton include a polyurethane skeleton, a polyacrylic skeleton, a polyester skeleton, a polyamide skeleton, a polyimide skeleton, and a polyurea skeleton. From the viewpoint of the storage stability of the ink composition, the polyurethane skeleton, the polyacrylic skeleton, and the polyester skeleton are preferable.

A structure of the polymer dispersant is not particularly limited. Examples of the structure of the polymer dispersant include a random polymer structure, a block polymer structure, a comb-shaped polymer structure, and a star-shaped polymer structure. The block polymer structure and the comb-shaped polymer structure are preferable from the viewpoint of the storage stability of the ink composition.

Specific examples of the polymer dispersant include wetting dispersants DISPER BYK 101, 102, 103, 106, 108, 109, 110, 111, 112, 116, 130, 140, 142, 145, 161, 162, 163, 164, 166, 167, 168, 170, 171, 174, 108, 182, 183, 184, 185, 2000, 2001, 2020, 2050, 2070, 2096, and 2150 (trade names, manufactured by BYK Chemie GmbH), EFKA 4008, 4009, 4010, 4015, 4020, 4046, 4047, 4050, 4055, 4060, 4080, 4300, 4330, 4340, 4400, 4401, 4402, 4403, 4406, 4800, 5010, 5044, 5054, 5055, 5063, 5064, 5065, 5066, 5070, and 5244 (trade names, manufactured by Ciba Specialties Chemicals), SOLSPERSE 3000, 5000, 11200, 13240, 13650, 13940, 16000, 17000, 18000, 20000, 21000, 24000SC, 24000GR, 26000, 28000, 31845, 32000, 32500, 32550, 32600, 33000, 34750, 35100, 35200, 36000, 36600, 37500, 38500, 39000, 53095, 54000, 55000, 56000, and 71000 (trade names, manufactured by The Lubrizol Corporation), DISPAR LON 1210, 1220, 1831, 1850, 1860, 2100, 2150, 2200, 7004, KS-260, KS-273N, KS-860, KS-873N, PW-36, DN-900, DA-234, DA-325, DA-375, DA-550, DA-1200, DA-1401, and DA-7301 (trade names, manufactured by Kusumoto Chemicals, Ltd.), AJISPER PB-711, PB-821, PB-822, PN-411, and PA-111 (trade names, manufactured by Ajinomoto-Fine-Techno Co., Inc.), SURFYNOL 104A, 104C, 104E, 104H, 104S, 104BC, 104DPM, 104PA, 104PG-50, 420, 440, DF110D, DF110L, DF37, DF58, DF75, DF210, CT111, CT121, CT131, CT136, GA, TG, and TGE (trade names, manufactured by Air Products and Chemicals, Inc.), OLFINE, STG, and E1004 (trade names, manufactured by Nissin Chemical Industry Co., Ltd.), SN SPERSE 70, 2120, and 2190 (trade names, manufactured by SAN NOPCO LIMITED), ADEKA COL series and ADEKA TOL series (trade names, manufactured by ADEKA CORPORATION), SANNONIC series, NAROACTY CL series, EMULMIN series, NEWPOL PE series, IONET M series, IONET D series, IONET S series, IONET T series, and SANSPEARL 100 (trade names, manufactured by Sanyo Chemical Industries, Ltd.).

An absolute value of a difference between an acid value of the polymer dispersant and an amine value of the polymer dispersant is preferably in a range of from 0 mgKOH/g to 100 mgKOH/g, more preferably in a range of from 0 mgKOH/g to 60 mgKOH/g, and further preferably in a range of from 0 mgKOH/g to 30 mgKOH/g, from the viewpoint of balancing storage stability and curing rate. In this regard, the "acid value" means an acid value per 1 g of the solid content of the polymer dispersant and it may be determined by the potentiometric titration in accordance with Japanese Industrial Standard (JIS K 0070), the disclosure of which is incorporated by reference herein. The "amine value" is an amine value of 1 g of the solid content of the polymer dispersant. An amine value is determined by converting a value measured by potentiometric titration with 0.1N hydrochloric acid aqueous solution into an equivalent weight of potassium hydroxide. When plural dispersants are used, the amine value may be represented by a weight average of their amine values.

The amount of the polymer dispersant in the ink composition is preferably set so that the ratio (D/P) becomes $0.01 \leq D/P \leq 1.5$, more preferably $0.03 \leq D/P \leq 1.0$, further preferably $0.05 \leq D/P \leq 0.6$, in which P represents the content of the pigment in the ink composition and D represents the content of the polymer dispersant (B) in the ink composition.

When such condition is satisfied, the pigment may not aggregate or precipitate, and the ink viscosity may not be increased, and thus the ink composition may become excellent in storage stability. Further, the ink viscosity may be low, and thus the ink composition may become excellent in ejection stability.

(C) Cationic Polymerizable Compound

The cationic polymerizable compound used in the invention is not particularly limited as long as it starts a polymerization reaction by an acid formed from a cationic polymerization initiator and is cured. Various known cationic polymerizable monomers known as a photo-cationic polymerizable monomer may be used. Examples of the cationic polymerizable monomer include epoxy compounds, vinyl ether compounds, and oxetane compounds described in JP-A Nos. 6-9714, 2001-31892, 2001-40068, 2001-55507, 2001-310938, 2001-310937, and/or 2001-220526.

Examples of the epoxy compounds include aromatic epoxides, alicyclic epoxides, and aromatic epoxides.

Specific examples of the epoxy compound which may be used in the invention include compounds described in paragraphs [0037] to [0041] of JP-A No. 2008-13646.

Among these epoxy compounds, aromatic epoxides and alicyclic epoxides are preferable, and alicyclic epoxides are particularly preferable, from the viewpoint of obtaining excellent curing rate.

Specific examples of the vinyl ether compound which may be used in the invention include compounds described in paragraphs [0042[ to [0044] of JP-A No. 2008-13646.

The vinyl ether compound is preferably divinylether compound or trivinylether compound, and particularly preferably a divinylether compound, from the viewpoint of curability, adhesion property with a recording medium, and surface hardness of a formed image.

The oxetane compound which may be used in the invention is a compound having at least one oxetane ring. Known oxetane compounds described in JP-A Nos. 2001-220526, 2001-310937, and/or 2003-341217 may be arbitrarily selected for use.

The compound having one oxetane ring which may be used for the ink composition of the invention is preferably a compound having 1 to 4 oxetane rings in its structure. The use of such compounds may allow for easily keeping the viscosity of the ink composition in the range in which handling properties thereof being good and a high adhesion of the cured ink with the recorded medium being obtained.

Specific examples of the oxetane compound which may be used in the invention include compounds described in paragraphs [0046] to [0061] of JP-A No. 2008-13646.

Examples of the compound having an oxetane ring are specifically described in paragraphs [0021] to [0084] of JP-A No. 2003-341217 and the compounds described therein may be suitably used.

Oxetane compounds which are specifically described in paragraphs [0022] to [0058] of JP-A No. 2004-91556 may also be used in the invention.

Among the oxetane compounds to be used in the invention, the compound having one oxetane ring is preferably used from the viewpoint of the viscosity and adhesiveness of the ink composition.

In the ink composition of the invention, the cationic polymerizable compound (C) may be used alone or in combination. From the viewpoint of effectively suppressing the shrinkage at the time of curing the ink, it is preferable to use a combination of the vinyl ether compound with at least one compound selected from oxetane compounds and epoxy compounds.

The content of the cationic polymerizable compound in the ink composition is preferably from 10% by mass to 95% by mass, more preferably from 30% by mass to 90% by mass, further preferably from 50% by mass to 85% by mass, based on the total solid of the composition. When the content of the cationic polymerizable compound in the ink composition is within such range, the ink composition may have excellent curability.

In preferable embodiments, an amount of the cationic polymerizable compound used for preparation of the pigment dispersion and an amount of the cationic polymerizable compound added after the preparation of the pigment dispersion are suitably adjusted so that the content of the cationic polymerizable compound in the ink composition is within the above range.

(D) Cationic Polymerization Initiator

The ink composition of the invention contains a cationic polymerization initiator. The cationic polymerization initiator is preferably a compound generating an acid by being irradiated with radiation (hereinafter referred to as the acid-generating agent or photo-acid generator).

The cationic polymerization initiator is preferably a photo-acid generator, and preferable examples thereof include a photo-cationic polymerization photoinitiator and a compound which forms an acid by being irradiated with light beams used for microresist (such as ultraviolet rays in the range of 400 nm to 200 nm or far ultraviolet rays, and particularly preferably, g-rays, h-rays, i-rays, or KrF excimer laser beams), ArF excimer laser beams, electron beams, X-rays, molecular beams, or ion beams.

Examples of the polymerization initiator (preferably the photo-acid generator) include onium salt compounds (which degrade by being irradiated with radiation and form an acid) such as diazonium salts, phosphonium salts, sulfonium salts, or iodonium salts; and sulfonate compounds such as imide sulfonate, oxime sulfonate, diazodisulfone, disulfone, or o-nitrobenzylsulfonate.

Specific examples of the cationic polymerization initiator include compounds described as the photo-acid generator in paragraphs [0064] to [0121] of JP-A No. 2008-13646. Exemplary compounds (B-1) to (b-95) described therein may be suitably used.

Oxazol derivatives and s-triazine derivatives described in paragraphs [0029] to [0030] of JP-A No. 2002-122994 may be also suitably used. Herein, a "derivative" of a specific compound means a compound obtained by substituting, for an atom or an atomic group which is a partial structure of the specific compound, another atom or another atomic group.

Further, onium salt compounds and sulfonate compounds exemplified in paragraphs [0037] to [0063] of JP-A No. 2002-122994 may be suitably used.

The cationic polymerization initiator may be used alone or in combination.

The content of the cationic polymerization initiator (D) in the ink composition is preferably from 0.1% by mass to 20% by mass, more preferably from 0.5% by mass to 10% by mass, and further preferably from 1% by mass to 7% by mass based on the total solid content of the ink composition.

In preferable embodiments, the ink composition of the invention may be produced by a method including: preparing a pigment dispersion by mixing the azo pigment, the polymer dispersant, and optionally a part of the cationic polymerizable compound If necessary; and mixing the pigment dispersion with the cationic polymerizable compound and the acid generator which is the cationic polymerization initiator.

The mixing may be performed using a stirrer (mixer) which is conventionally used in the art. Conditions of stirring for the mixing are suitably set. In order to avoid unnecessary modification of the ink composition, the temperature at the time of stirring is set so as to be preferably 50° C. or less, and more preferably 40° C. or less.

Since the ink composition of the invention is a composition to be cured by active radiations such as ultraviolet rays, the ink composition is preferably substantially free of solvent or small amount of the solvent is contained in the ink composition from the viewpoint of the curing sensitivity.

The ink composition of the invention contains a cationic polymerizable compound as a curable component. In preparation of the pigment dispersant, a part of the cationic polymerizable compound may be used in place of a solvent, or alternatively, it may be used in combination with a solvent.

A part of the cationic polymerizable compound, which may be optionally used for forming the pigment dispersion, may be the same as or different from the cationic polymerizable compound to be added in the following mixing process.

Preferable examples of the cationic polymerizable compound to be used for preparation of the pigment dispersion include those having a low viscosity. The use of the cationic polymerizable compound having low viscosity may allow for preparation of a pigment dispersion having a low viscosity and containing highly dispersed components.

The content of the cationic polymerizable compound in the pigment dispersion other than a white pigment dispersion is preferably from 5% by mass to 90% by mass, more preferably from 10% by mass to 85% by mass, and further preferably from 15% by mass to 80% by mass, based on the total amount of the pigment dispersion. When the pigment dispersion contains a white pigment as the pigment, the content is preferably from 10% by mass to 70% by mass, more preferably from 15% by mass to 65% by mass, and further preferably from 20% by mass to 60% by mass, based on the total amount of the pigment dispersion. When the content of the cationic polymerizable compound is within such range, the pigment dispersion may have excellent viscosity and highly dispersed components.

The viscosity of the cationic polymerizable compound used for the pigment dispersion at 25° C. is preferably from 3 mPa·s to 200 mPa·s, more preferably from 4 mPa·s to 100 mPa·s, and further preferably from 5 mPa·s to 50 mPa·s.

The number of the functional group of the cationic polymerizable compound to be used for the pigment dispersion is not particularly limited. It is preferably 1 to 4, more preferably 1 to 2, further preferably 1.

In the preparation of the pigment dispersion, the order of mixing of the cationic polymerizable compound, the polymer dispersant, a auxiliary disperser, and the pigment is not particularly limited. In preferable embodiments, the pigment, the polymer dispersant, and the auxiliary disperser are firstly mixed, and then the cationic polymerizable compound is added thereto and dispersed. In other preferable embodiments, the cationic polymerizable compound, the polymer dispersant, and the auxiliary disperser are firstly mixed, and then the pigment added thereto and dispersed.

In particularly preferable embodiments, the polymer dispersant and the cationic polymerizable compound are firstly mixed, the auxiliary disperser is added thereto and further mixed, and then the pigment is added thereto and mixed and dispersed. The thus-prepared pigment dispersion may contain more highly dispersed components.

Examples of dispersing apparatus to be used for the dispersion of the pigment include various dispersing apparatus such as a ball mill, a bead mill, a sand mill, a salt mill, an attritor, a roll mill, an agitator, a henschel mixer, a colloid mill, an ultrasonic homogenizer, a pearl mill, a wet-type jet mill, or a paint shaker. Among them, the bead mill disperser ma be preferably used to produce a pigment dispersion which contains highly dispersed components. An average particle diameter of beads to be used for bead mill dispersing is from 0.01 mm to 3.0 mm, from preferably 0.05 mm to 1.5 mm, and more preferably from 0.1 mm to 1.0 mm. The use of the beads may allow for production of the pigment dispersion which contains highly dispersed components.

The content of the pigment dispersion in the ink composition is suitably selected according to the king and the content of the used pigment in the pigment dispersion as well as the aimed color density of the ink composition. The content is preferably from 0.1% by mass to 50% by mass, more preferably from 0.5% by mass to 40% by mass, and further preferably from 1.0% by mass to 30% by mass, based on the total amount of the ink composition. When the content of the pigment dispersion is within such range, the ink composition may have an appropriate viscosity and excellent printing performance (ejectability).

(E) Other Components

Amine Compound

In addition to the azo pigment, the polymer dispersant, the cationic polymerizable compound and the cationic polymerization initiator, the ink composition of the invention may preferably further contain an amine compound in view of improving storage stability by suppressing thickening of the ink composition due to dark polymerization by capturing an acid formed by dark reaction of the cationic polymerization initiator, and further in view of improving ejection stability by suppressing unnecessary curing of the ink composition on a nozzle plate by capturing an acid formed from the cationic polymerization initiator due to leaking light.

The amine compound which may be used in the invention is not particularly limited, and any conventionally known amine compound may be used.

The amine compound may be a compound which has one amine site in its molecule or a compound which has two or more amine sites in its molecule. Further, it may have substituent groups such as an alkyl group, an alkenyl group, an alkynyl group, a halogen atom (—F, —Br, —Cl, —I), a hydroxyl group, an alkoxy group, an aryloxy group, an alkylthio group, an arylthio group, an acyl group, an acyloxy group, an alkoxycarbonyl group, or an aryloxy carbonyl group.

From the viewpoint of safety, a boiling point of the amine compound may be preferably 120° C. or more, more preferably 150° C. or more, and further preferably 180° C. or more, under the standard atmospheric pressure. The molecular weight of the amine compound is preferably from 100 to 1,000, more preferably from 150 to 800, and further preferably from 200 to 600.

The amine compound may be a primary amine compound, a secondary amine compound, or a tertiary amine compound. From the viewpoint of suppressing the side reaction of the amine compound with the polymerizable compound and the discoloration reaction, the tertiary amine compound may be preferably used. The amine compound may be a fatty amine compound or an aromatic amine compound. From the viewpoint of the acid-capturing capacity, the amine compound may be preferably the fatty amine compound.

In consideration of these, preferable examples of the amine compound which may be suitably used in the invention include an aliphatic tertiary amine compound which has a boiling point of 180° C. or more under the standard atmospheric pressure and a molecular weight of from 200 to 600.

Specific examples of the amine compound which may be used in the invention include the following, although the invention is not limited thereto.

Examples of the amine compound include n-hexylamine, n-octylamine, di-n-butylamine, tri-n-hexylamine, cyclohexylamine, dicyclohexylamine, 3-(di-n-butylamino) propylamine, 3-amino-1-phenylbutane, N-t-butylpyrrolidine, 2,6-dimethylpiperidine, decahydroquinoline, decahydroisoquinoline, tropine, 2,2,6,6-tetramethyl-4-piperidone, 1-(2-pyridyl)piperazine, N,N'-dimethylpiperazine, 1,4-diazabicyclo[2.2.2]octane, 4-pyrrolidinopyridine, cumylamine, 3-butoxypropylamine, 3-methylthiopropylamine, bis (3-aminopropyl)ether, N,N-di-n-propylaniline, N,N-bis(3-aminopropyl)methylamine, N-(3-aminopropyl)morpholine, N-benzyl-2-methyl-1,3-propanediamine, hexamethylenetetramine, hexahydro-1,3,5-triphenyl-1,3,5-triazine, 1,4,7-trimethyl-1,4,7-triazacyclononane, 1,4,7,10-tetraazacyclododecane, tris(3-aminopropyl)amine, N,N-dimethylaniline, 1-ethylpyrrole, 2,5-dimethylpyrrole, 4-(dimethylamino) pyridine, 2,6-dichloropyridine, 2,6-diaminopyridine, 2,6-dimethyl-4-hydroxypyridine, diethyl 2,6-pyridinedicarboxylate, 2,4,6-trimethylpyridine, 4-vinylpyridine, 3-acetylpyridine, 2-benzoylpyridine, methyl nicotinate, 2,2'-bipyridyl, 2,2':6',2"-ter-pyridine, quinoline, isoquinoline, 8-quinolinol, acridine, 5-aminoindole, carbazole, phenanthridine, 9 (10H)-acridone, 1,6-naphthyridine, 1,8-naphthyridine, 1,10-phenanthroline, quinacridone, and 1H-pyrrolo[2,3-b]pyridine.

Particularly preferable examples of the amine compound include a hindered amine compound, and more preferable examples thereof include a hindered amine compound having no nucleophilic moiety in its molecule.

Hindered Amine Compound Having No Nucleophilic Moiety in its Molecule

The (a) hindered amine compound having no nucleophilic moiety in its molecule (hereinafter sometimes referred to as "a hindered amine compound having the specific structure") is characterized by not having any nucleophilic moiety other than a basic nitrogen atom having great steric hindrance. The "nucleophilic moiety" as used herein means a functional group having a nucleophilic property attributed to an unshared electron pair, with examples including an ester group, an ether group, a hydroxyl group, an amino group, a thiol group, a thiocarbonyl group and a thioester group. By using the hindered amine compound having the specific structure, it becomes possible to trap an acid produced in a trace amount without inhibiting a cationic polymerization reaction, so that storage stability and ejection stability may be improved with maintaining high curing sensitivity.

In cationic polymerization reaction, a precursor to be a polymer by polymerization has a cationic terminal to be elongated. The nucleophilic moiety is expected to hinder the elongation reaction by reacting with the cationic terminal during the elongation reaction, which may result in decrease of curing sensitivity. In view of suppressing the hindrance of the elongation reaction, the hindered amine compound having the specific structure has a basic nitrogen atom which is surrounded by a sterically bulky substituent. Steric repulsion caused by the sterically bulky substituent may suppress reaction of the basic nitrogen atom and the cationic terminal, which may result in improvements of storage stability and ejection stability.

The hindered amine compound having the specific structure captures an acid formed by dark reaction or an acid formed due to leaking light. Therefore, the use of such hindered amine compound may improve storage stability and ejection stability of the ink composition. Further, steric repulsion caused by the sterically bulky substituent around the basic nitrogen atom of the hindered amine compound having the specific structure may result in suppression of reaction between the basic nitrogen atom and the cationic terminal when curing is performed by irradiation under normal conditions. Therefore, the use of such hindered amine compound may suppress hindrance of cationic polymerization reaction to facilitate to maintain curing sensitivity of the ink composition.

Examples of the hindered amine compound having the specific structure include compounds described in paragraphs [0021] to [0036] of JP-A No. 2008-189776.

Examples of a hindered amine which is different from the hindered amine compound having the specific structure having the specific structure include compounds described in paragraphs [0040] to [0044] of JP-A No. 2008-189776.

The Amine Compound May be Used Singly or in a Combination of Two or More Thereof.

The content of the hindered amine compound, which is preferably that having the specific structure, is suitably in a range of from 0.1% by mass to 10% by mass, preferably in a range of from 0.3% by mass to 8% by mass, and more preferably in a range of from 0.5% by mass to 6% by mass, based on the total amount of the ink composition. When the content of the hindered amine compound is within such range, the ink composition may have excellent curing sensitivity and improved storage stability and ejection stability.

Ultraviolet Absorbing Agent

The ink composition of the invention may further contain an ultraviolet absorbing agent in view of improving weather resistance of images formed and suppressing discoloration.

Examples of the ultraviolet absorbing agent include the benzotriazole compounds described in JP-A Nos. 58-185677, 61-190537, 2-782, 5-197075 or 9-34057, the benzophenone compounds described in JP-A Nos. 46-2784 or 5-194483 and U.S. Pat. No. 3,214,463, the cinnamic acid compounds described in JP-B Nos. 48-30492, 56-21141 or JP-A No. 10-88106, the triazine compounds described in JP-A Nos. 4-298503, 8-53427, 8-239368, 10-182621 or PCT National Publication No. 8-501291, the compounds described in Research Disclosure, No. 24239, and compounds emitting fluorescence upon absorption of ultraviolet rays, which are typified by stilbene compounds, benzoxazole compounds and the like, and compounds known as fluorescent whitening agents.

The content of the ultraviolet absorbing agent may be adjusted according to applications. In general, the content is approximately in a range of from 0.5% by mass to 15% by mass based on a total amount of the ink composition.

Antioxidant

The ink composition of the invention may further contain an antioxidant in view of improving stability. Examples of the antioxidant include those described in European Patent Nos. 223739, 309401, 309402, 310551, 310552, and 459416, German Patent No. 3435443, JP-A Nos. 54-48535, 62-262047, 63-113536, 63-163351, 2-262654, 2-71262, 3-121449, 5-61166, and 5-119449, and U.S. Pat. Nos. 4,814,262 and 4,980,275.

The content of the antioxidant in the ink composition may be adjusted according to applications. In general, the content is approximately 0.1% by mass to 8% by mass based on the total amount of the ink composition.

Antifading Agent

The ink composition of the invention may further contain various organic antifading agents and metal complex antifading agents. Examples of the organic antifading agents include hydroquinones, alkoxy phenols, dialkoxy phenols, phenols, anilines, amines, indanes, chromanes, alkoxy anilines, and heterocycles. Examples of the metal complex antifading agents include nickel complexes and zinc complexes. Specific examples thereof include the compounds described in patents cited in Research Disclosure No. 17643, VII, Sections I to J, Research Disclosure No. 15162, Research Disclosure No. 18716, p. 650 left column, Research Disclosure No. 36544, p. 527, Research Disclosure No. 307105, p. 872, and Research Disclosure No. 15162, and the compounds included in the formula of typical compounds and compound examples described in JP-A No. 62-215272, pp. 127-137.

The content of the antifading agent in the ink composition may be adjusted according to applications. In embodiments, the content may be preferably 0.1% by mass to 8% by mass based on the total amount of the ink composition.

Conductive Salt

The ink composition of the invention may further contain, for the purpose of controlling the ejection properties, a conductive salt such as potassium thiocyanate, lithium nitrate, ammonium thiocyanate, or dimethylamine hydrochloride.

Solvent

The ink composition of the invention may further contain an extremely trace amount of organic solvent for improving adhesiveness to the recording medium.

Examples of the organic solvent include ketone solvents such as acetone, methylethylketone or diethylketone; alcohol solvents such as methanol, ethanol, 2-propanol, 1-propanol, 1-butanol or tert-butanol; chlorine-based solvents such as chloroform or methylene chloride; aromatic solvents such as benzene or toluene; ester solvents such as ethyl acetate, butyl acetate or isopropyl acetate; ether solvents such as diethylether, tetrahydrofuran or dioxane; glycol ether solvents such as ethylene glycol monomethyl ether or ethylene glycol dimethyl ether.

The content of the solvent in the ink composition which may be effective is in the range that does not cause problems in solvent resistance and VOC. In embodiments, the content may be preferably at most 5% by mass, more preferably at most 3% by mass, and particularly preferably substantially 0% by mass, based on the total amount of the ink composition.

Polymer Compound

The ink composition of the invention may further contain various polymer compounds for controlling the physical properties of the image formed therefrom as a film. Examples of the polymer compound include acrylic polymers, polyvinylbutyral resins, polyurethane resins, polyamide resins, polyester resins, epoxy resins, phenol resins, polycarbonate resins, polyvinylbutyral resins, polyvinylformal resins, shellac, vinyl resins, acrylic resins, rubber resin, waxes, and other natural resins. These compounds may be used in combination of two or more. Among them, vinyl copolymers obtained by copolymerization of acrylic monomers are preferable. Preferable examples of the polymer compound further include copolymers containing, as copolymerization components, structural units derived from a carboxyl group-containing monomer, structural units derived from an alkyl methacrylate ester, and/or structural units derived from an alkyl acrylate ester.

Herein, the "structural unit (of a polymer) derived from a specific monomer" means a unit that has a structure which can be typically incorporated into the polymer by employing the specific monomer as that to be polymerized for forming the polymer.

Surfactant

The ink composition of the invention may further contain a surfactant.

Examples of the surfactant include those described in JP-A Nos. 62-173463 or 62-183457. Specific examples of the surfactant include: anionic surfactants such as dialkyl sulfosuccinates, alkyl naphthalenesulfonates, or fatty acid salts; nonionic surfactants such as polyoxyethylene alkyl ethers, polyoxyethylene alkyl aryl ethers, acetylene glycols, polyoxyethylene/polyoxypropylene block copolymers, or silicone oils; and cationic surfactants such as alkylamine salts or quaternary ammonium salts. An organic fluorinated compound may be used in place of the surfactant. The organic fluorinated compound is preferably hydrophobic. Examples of the fluorinated organic compound include fluorochemical surfactants, fluorinated compounds in an oily state (e.g., fluorinated oil) and fluorinated compound resins in a solid state (e.g., tetrafluoroethylene resin), and specific examples thereof include those described in JP-B No. 57-9053 (columns 8 to 17) or JP-A No. 62-135826.

The content of the surfactant in the ink composition may be adjusted according to the surface tension suitable for ejection from inkjet heads. In embodiments, the content may be preferably from 0% by mass to 6% by mass, more preferably from 0% by mass to 4% by mass, and further preferably from 0% by mass to 2% by mass, based on the total amount of the ink composition.

Other Additives

The ink composition of the invention may further contain a leveling additive, a matting agent, a wax for adjustment of film physical properties, and/or a tackifier that does not inhibit polymerization for improving adhesiveness to the recording medium formed of polyolefin, PET or the like as necessary.

Specific examples of the tackifier include the high-molecular weight adhesive polymers described in JP-A No. 2001-49200, pp. 5 to 6 (e.g., copolymers formed from an ester formed of (meth)acrylic acid and an alcohol with an alkyl group having 1 to 20 carbon atoms, an ester formed of (meth) acrylic acid and an alicyclic alcohol having 3 to 14 carbon atoms, and an ester formed of (meth)acrylic acid and an aromatic alcohol having 6 to 14 carbon atoms), and a low-molecular weight adhesive resin containing a polymerizable unsaturated bond.

Sensitizer

The ink composition of the invention may further contain a sensitizer for the purposes of improving acid generation efficiency of the cationic polymerization initiator (preferably a photo-acid generator) and shifting sensitization wavelengths to the longer wavelength side. Any sensitizer may be used as long as it can sensitize the cationic polymerization initiator (preferably a photo-acid generator) through an electron transfer mechanism or an energy transfer mechanism. Preferable examples thereof include a condensed polycyclic aromatic ring compound such as anthracene, 9,10-dialkoxyanthracene, pyrene or perylene, an aromatic ketone compound such as acetophenone, benzophenone, thioxanthone or Michler's ketone, and a heterocyclic compound such as phenothiazine or an N-aryloxazolidinone. The content of the sensitizer is generally in a range of from 0.01 mole % to 1 mole %, and preferably in a range of from 0.1 mole % to 0.5 mole %, based on the amount of photo-acid generators used in the ink composition of the invention, although it is appropriately selected according to the desired purpose.

More preferable examples of the sensitizer include compounds described in paragraphs [0085] to [0098] of JP-A No. 2008-214395.

The content of the sensitizer in the ink composition may be adjusted according to applications. In embodiments, the content may be preferably 0.05% by mass to 4% by mass based on the total amount of the ink composition.

Physical Property of Ink Composition

In consideration of the ejection properties, the viscosity of the ink composition of the invention at 25° C. is preferably at most 40 mPa·s, more preferably from 5 mPa·s to 40 mPa·s, and further preferably from 7 mPa·s to 30 mPa·s. The viscosity of the ink composition of the invention at the temperature during ejection (preferably from 25° C. to 80° C. and more preferably from 25° C. to 50° C.) is preferably from 3 mPa·s to 15 mPa·s, and more preferably from 3 mPa·s to 13 mPa·s.

The ratio of amounts of components of the ink composition of the invention is preferably properly adjusted so that the viscosity falls within the above-described range. When the viscosity of the ink composition at room temperature is set as being high, penetration of the ink composition into a recording medium may be avoided even if the recording medium is porous, which allows to reduce the amount of uncured monomers. Further, bleeding of the ink droplets landed on the recording medium may be reduced, which may result in the improvement of image quality.

The surface tension of the ink composition according to the invention is preferably 20 mN/m to 35 mN/m, and more preferably 23 mN/m to 33 mN/m. When the ink composition of the invention is applied to various recording media such as polyolefin, PET, coated paper, or non-coated paper, the surface tension thereof is preferably 20 mN/m or more for suppressing ink bleeding and penetration, and is preferably 35 mN/m or less for improving wettability therewith.

Inkjet Recording Method and Printed Matter

The inkjet recording method, that is one aspect of the invention, includes at least: ejecting the ink composition onto a recording medium such as a support or a recording material; and curing the ejected ink composition by irradiating active radiation.

This inkjet recording method provides an image formed of cured ink composition on the recording medium.

The printed matter, that is one aspect of the invention, is a product (print) formed by the inkjet recording method.

In embodiments, the inkjet recording method may be performed by using the following inkjet recording apparatus.

Inkjet Recording Apparatus

The inkjet recording apparatus used in the inkjet recording method of the invention is not particularly limited, and any one of commercially available inkjet recording apparatuses may be used. That is, any commercially available inkjet recording apparatus may perform the ejection of the ink composition on an image recording medium as defined in the inkjet recording method of the invention.

The inkjet recording apparatus used in the invention has, for example, an ink-supplying system, a temperature sensor, and an active radiation source.

The ink-supplying system has, for example, a stock tank storing an inkjet composition of the invention, a supply pipe, an inkjet composition-supplying tank which supplies the ink composition t to the inkjet head, a filter, and a piezoelectric inkjet head. The piezoelectric inkjet head may be driven to eject multi-sized dots in amounts of from 1 pl to 100 pl, preferably from 8 pl to 30 pl, at a definition of from 320×320 dpi to 4,000×4,000 dpi, preferably from 400×400 dpi to 1,600×1,600 dpi, and more preferably 720×720 dpi. The "dpi" in the invention means the dot number per 2.54 cm.

A radiation curable ink preferably has a constant temperature at the time of ejection. Therefore, the inkjet recording apparatus preferably has a unit for stabilizing the temperature of the ink composition to be ejected. Piping systems and units ranging from ink tanks, which may include an intermediate ink tank when exists, to the ejection portion of nozzles of inkjet heads are subjected to the temperature stabilization. Therefore, the section from the ink supply tank to the inkjet head may be thermally insulated and heated.

The method for regulating the temperature is not limited, and preferable examples thereof include a method of providing a plurality of temperature sensors in piping areas, thereby regulating the temperature in accordance with the ink flow and the environmental temperature. The temperature sensors may be provided on the ink supply tank and in the vicinity of the nozzle of the inkjet head. The head unit to be heated is preferably thermally blocked or insulated to suppress affection of the main body of the apparatus by the temperature of an external air. In order to reduce the warm-up time of the printer, or reduce the heat energy loss, it is preferable that the head unit is thermally insulated from other sections, and the thermal capacity of the whole unit to be heated is preferably smaller.

When the ink composition for ink jet recording according to the invention is ejected, it is preferable to decrease the viscosity of the ink composition to from 3 mPa·s to 15 mPa·s (more preferably from 3 mPa·s to 13 mPa·s) by heating the ink composition to from 25° C. to 80° C. (more preferably from 25° C. to 50° C.) before ejection. Specifically, ejection may be well performed when the inkjet recording method employs, as the ink composition of the invention, one that has the viscosity of 50 mPa·s or less at 25° C. In this manner, it is possible to realize highly stable ejection.

Generally, radiation-curable ink compositions, such as the ink composition for ink jet recording according to the invention, are more viscous than aqueous inks, and the fluctuation in the viscosity of radiation-curable ink compositions caused by the fluctuation in temperature during printing is larger. The fluctuation in the viscosity of ink composition exerts significant influences on the droplet size and the droplet ejection speed, causing deterioration in image quality, and thus, it is necessary to keep the temperature of the ink composition as constant as possible during printing. It is preferable to regulate the ink composition temperature within ±5° C. from the set temperature, more preferably ±2° C. from the set temperature, and still more preferably ±1° C. from the set temperature.

The ink composition of the invention, that has excellent ejection stability due to its formulation, may be uniformly ejected in application with any recording apparatuses and may facilitate to form a high resolution image.

The ink composition ejected onto the surface of the recording medium support is cured by irradiation with active radiation. This is because the cationic polymerization initiator contained in the ink composition is decomposed by irradiation of active radiation so as to generate a cation, and the function of the cation is exhibited so as to cause and promote polymerization of cationic polymerizable compounds in the ink composition. At this time, if there is a sensitizing dye present together with the cationic polymerization initiator in the ink composition, the sensitizing dye in the system is activated into an excited state by absorption of the active radiation, accelerating decomposition of the cationic polymerization initiator upon contact with the cationic polymerization initiator, and a more sensitive curing reaction may be achieved.

Examples of the active radiation used herein include α rays, γ rays, electron beam, X rays, ultraviolet light, visible light, and infrared light. Although the peak wavelength of the active radiation varies according to the absorption properties of the sensitizing dye, but is, for example, in a range of from 200 nm to 600 nm, preferably in a range of from 300 nm to 450 nm, and more preferably in a range of from 350 nm to 420 nm.

The ink composition of the invention may have sufficient sensitivity even to low output active radiations. In embodiments, the ink composition of the invention may be suitably cured by active radiations having the illumination intensity on the exposed surface of from 10 mW/cm$^2$ to 4,000 mW/cm$^2$, and preferably from 20 mW/cm$^2$ to 2,500 mW/cm$^2$.

Mercury lamps, gas or solid state lasers and the like are widely used as active radiation sources, and mercury lamps and metal halide lamps are widely used for UV-curing inkjet. However, under the current strong needs for the elimination of the use of mercury from the viewpoint of environmental protection, it is very important industrially and environmentally to replace mercury lamps with GaN-type semiconductor UV-emitting devices. In addition, LED's (UV-LED) and LD's (UV-LD) are smaller in size, longer in lifetime, higher in efficiency, and lower in cost, and thus, attracting attention as light sources for radiation-curing inkjet printers.

As described above, a light-emitting diode (LED) or a laser diode (LD) may be used as the active radiation source. An ultraviolet LED or an ultraviolet LD may be used when an ultraviolet ray source is required. For example, a purple LED having a main emission spectrum in the wavelength range of 365 nm to 420 nm is available from Nichia Corporation. As to a light having a still shorter wavelength, U.S. Pat. No. 6,084,250 (the disclosure of which is incorporated herein by reference) discloses an LED having a main emission spectrum in the wavelength region of 300 nm to 370 nm. Other ultraviolet LED's are also commercially available, and capable of emitting radiations of different UV ranges. The radiation ray source used in the invention is preferably a UV-LED, and particularly preferably a UV-LED having a peak wavelength in the range of 350 nm to 420 nm.

The maximum illuminance of LED light on the image recording medium is preferably from 10 mW/cm$^2$, to 2000 mW/cm$^2$, more preferably from 20 mW/cm$^2$ to 1000 mW/cm$^2$, and still more preferably from 50 mW/cm$^2$ to 800 mW/cm$^2$.

The ink composition according to the invention may be irradiated with active radiation, for example, for 0.01 seconds to 120 seconds, preferably for 0.1 seconds to 90 seconds.

The irradiation condition and the basic irradiation method with the active radiation are disclosed in JP-A No. 60-132767. Specifically, the exposure is performed in a so-called shuttle process, i.e., by scanning with a head unit having an ink-ejecting device and light sources disposed at both sides of the head unit. The active radiation is irradiated a certain period (e.g., from 0.01 to 0.5 second, preferably from 0.01 to 0.3 second, and more preferably, from 0.01 to 0.15 second) after ink deposition. When the time between ink deposition and irradiation is very short, bleeding of the uncured ink deposited on the recording medium may be suppressed. Further, even when a porous recording medium is used, ink is exposed to radiation before penetrating deep into the recording medium where the radiation does not reach, whereby residual unreacted monomer may be reduced to reduce odor.

The curing of the ink may be conducted with a light source that is not driven. WO 99/54415 Pamphlet discloses an irradiation method in which the recording area is irradiated with UV rays by using an optical fiber or by using a mirror disposed on a side wall of the head unit which minor reflects the collimated light. Such curing methods may also be applied in the ink jet recording method of the invention.

By employing such ink jet recording methods, the dot diameter of the deposited ink can be maintained constant even when various recording media that are different in surface wettability is used, thus improving the image quality.

The ink composition of the invention may have excellent ejection stability to be uniformly ejected, and may form a high resolution image and suppress generation of unevenness in density and streak-like unevenness in a formed image due to its high curing sensitivity to active radiation.

The ink composition of the invention may be combined with other color ink compositions to be used as an ink set. For example, a cyan ink composition, a magenta ink composition, and a yellow ink composition, at least one of which are the ink composition of the invention, may be combined to be used as an ink set.

In embodiments, a white ink composition and a black ink composition may be combined with the ink composition of the invention of yellow color to be used as an ink set. In embodiments, a light magenta ink composition, a light cyan ink composition and/or the like may be combined with the ink composition of the invention of yellow color to be used as an ink set.

In order to obtain a color image, it is preferable to form images by an order in which a color having higher lightness overcoats another color(s) having lower lightness. When color inks are applied in such order, the radiation reaches inks located at the lower portion; therefore, superior curing sensitivity, reduction in the amount of residual monomer, and improvement in adhesiveness may be achieved. Although it is possible to conduct the irradiation at once after finishing ejecting all inks, the irradiation may be performed at each time that each color ink is ejected (provided on the recording medium) in view of the acceleration of curing.

The ink composition may be cured with high sensitivity to the irradiation of active radiation in this manner to form an image of a surface of a recording medium.

An ink set including the ink composition of the invention may be suitably used in the method for inkjet recording of the invention. The order of ejection of each color ink in the ink set is not particularly limited. In preferable embodiments, the order is such that a color having higher lightness overcoats another color(s) having lower lightness over a recording medium. Specifically, when an ink set consisting of ink compositions with a yellow ink, a cyan ink, a magenta ink, and a black ink is used, it is preferably applied onto the recording medium in the order of yellow, cyan, magenta, and then black. When an ink set which includes at least seven colors of an ink composition group of a light cyan ink and a light magenta ink and a deep color ink composition group of a cyan ink, a magenta ink, a black ink, a white ink and a yellow ink is used, it is preferably applied onto the recorded medium in the order of white, light cyan, light magenta, yellow, cyan, magenta, and then black.

The recording medium used in the invention is not particularly limited. Any recording medium known as a support or a substrate may be used. Example thereof include papers, papers laminated with plastic (e.g., polyethylene, polypropylene and polystyrene), metal plates (e.g., aluminum, zinc and copper), plastic films (e.g., cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate and polyvinyl acetal), papers or plastic films laminated or deposited with above-described metal. In preferable embodiments, the recording medium may be a non-absorbable recording medium.

Ink Set

An ink set may be prepared so as to include one or more ink compositions of the present invention. There is no particular limitation to the ink set as long as it include prulal color ink compositions, at least one of which is the ink composition of the invention. This ink set may be preferably used in the invention.

In order to obtain a full color image using the ink composition, it is preferable to use an ink set in which deep color ink compositions with four colors of yellow, cyan, magenta, and black, in which at least one of the four inks is the ink composition of the invention, are combined. It is further preferable to use an ink set in which a deep color ink composition group having a yellow ink, a cyan ink, a magenta ink, a black ink, and a white ink, and an ink composition group having a light cyan ink and a light magenta ink, in which at least one of the seven inks is the ink composition of the invention, are combined. In this regard, the "deep color ink composition" herein means an ink composition in which the content of pigment is more than 1% by mass based on the total amount of the ink composition.

Printed Matter

The printed matter of the invention may be obtained by printing the ink composition of the invention on the recorded medium by an inkjet recording apparatus and then curing, preferably by irradiating with active radiation, the printed ink composition. Since the ink composition of the invention to be used for forming an image of the printed matter may have excellent ejection stability and curing sensitivity, the printed matter of the invention may have a high quality image in which the uniformity of ejected ink dots is good, the sharpness is excellent, the unevenness in density and the streak-like unevenness caused by the ununiformity of the shape of dots are suppressed. Therefore, the printed matter of the invention may be applied to wide fields.

EXAMPLES

Hereinafter, the invention will be described in more detail with reference to examples, but the invention is not limited to the examples. Further, "parts" and "%" are expressed in terms of mass, unless otherwise specified.

Synthesis Example 1

Synthesis of Exemplary Compound (Pig.-1)

The synthetic scheme of the Exemplary compound (Pig.-1) is shown below.

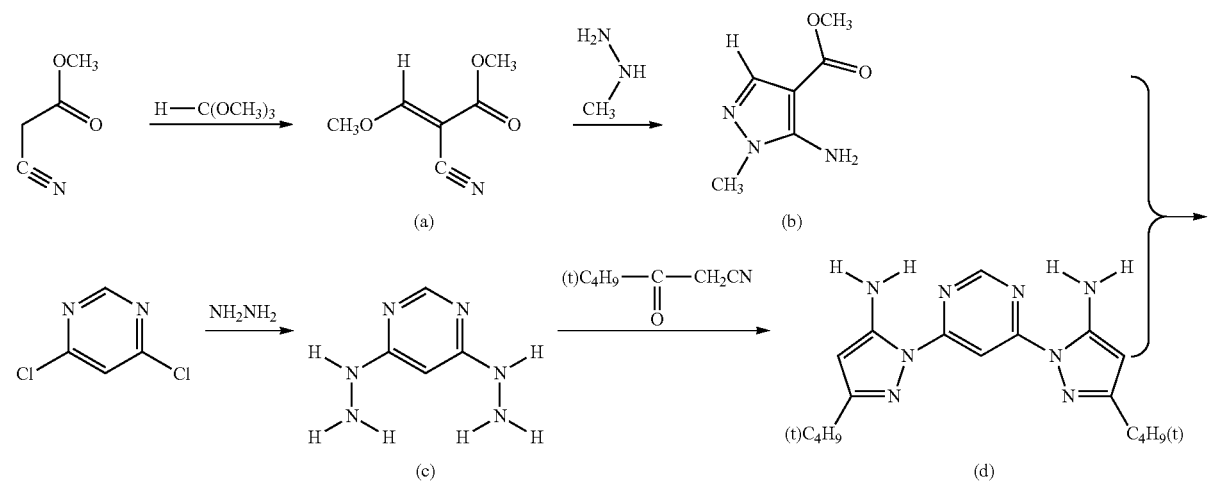

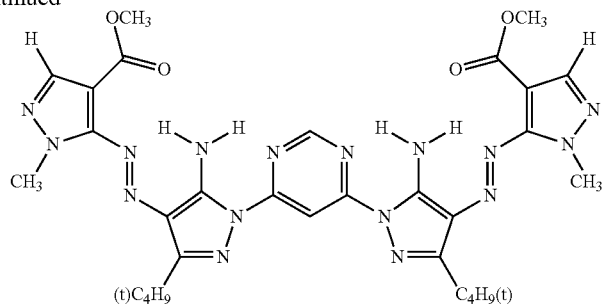

Pig.-1

(1) Synthesis of Intermediate (a)

42.4 g (0.4 mol) of trimethyl orthoformate, 20.4 g (0.2 mol) of acetic anhydride, and 0.5 g of p-toluenesulfonic acid were added to 29.7 g (0.3 mol) of methyl cyanoacetate, which was heated at 110° C. (outside temperature) and then stirred for 20 hours while a low-boiling-point component formed from the reaction system was distilled away. The reaction liquid was concentrated under reduced pressure. Thereafter, the resulting product was purified on a silica gel column, and 14.1 g of the intermediate (a) (yellow powder, yield: 30%) was obtained. The results of NMR measurement of the obtained intermediate (a) are shown below.

$^1$H-NMR (300 MHz, CDCl$_3$) 7.96 (s, 1H), 4.15 (s, 3H), 3.81 (s, 3H)

(2) Synthesis of Intermediate (b)

150 mL of i-propanol was added to 7.4 mL (141 mmol) of methylhydrazine, which was cooled to 15° C. (inside temperature). 7.0 g (49.6 mmol) of the intermediate (a) was gradually added to the mixed solution, which was then heated at 50° C. and stirred for 1 hour and 40 minutes. The reaction liquid was concentrated under reduced pressure. Thereafter, the resulting product was purified on a silica gel column, and 10.5 g of the intermediate (b) (white powder, yield: 50%) was obtained. The results of NMR measurement of the obtained intermediate (b) are shown below.

$^1$H-NMR (300 MHz, CDCl$_3$) 7.60 (s, 1H), 4.95 (brs, 2H), 3.80 (s, 3H), 3.60 (s, 3H)

(3) Synthesis of Intermediate (c)

100 mL of methanol was added to 130 mL of hydrazine monohydrate, which was cooled to 10° C. (inside temperature). 50.0 g (336 mmol) of 4,6-dichloropyrimidine was gradually added to the mixed solution (inside temperature: 20° C. or lower), which was then heated at 50° C. and stirred for 4 hours and 30 minutes. A crystal precipitated from the reaction liquid was filtered, washed with i-propanol, and dried. Thereby, 43.1 g of the intermediate (c) (white powder, yield: 92%) was obtained. The results of NMR measurement of the obtained intermediate (c) are shown below.

$^1$H-NMR (300 MHz, d$_6$-DMSO) 7.82 (s, 1H), 7.55 (s, 2H), 5.96 (s, 1H), 4.12 (s, 4H)

(4) Synthesis of Intermediate (d)

900 mL of water was added to 35.0 g (0.25 mol) of the intermediate (c) and 68.8 g (0.55 mol) of pivaloylacetonitrile, which was stirred at room temperature. 1 M hydrochloric acid aqueous solution was added dropwise into the suspension so as to give the pH of 3, which was then heated at 50° C. and stirred for 8 hours.

8 M potassium hydroxide aqueous solution was added dropwise into the reaction liquid, so as to adjust the pH to 8. Further, 1 M hydrochloric acid aqueous solution was added dropwise thereto so as to give the pH of 6. The precipitated crystal was filtered, washed with i-propanol, and dried. Thereby, 83.0 g of the intermediate (d) (white powder, yield: 94%) was obtained. The results of NMR measurement of the obtained intermediate (d) are shown below.

$^1$H-NMR (300 MHz, d$_6$-DMSO) 8.73 (s, 1H), 7.97 (s, 1H), 6.88 (s, 4H), 5.35 (s, 2H), 1.22 (s, 18H)

(5) Synthesis of Exemplary Compound (Pig.-1)

18.5 mL of acetic acid was added to 4.1 mL of concentrated sulfuric acid, which was cooled on ice and stirred. 3.85 g (12.1 mmol) of 40% nitrosylsulfuric acid was added dropwise thereto. 1.71 g (11.0 mmol) of the intermediate (b) was gradually added to the mixed solution (inside temperature: 0° C. or lower), which was then stirred at 0° C. for 2 hours. 150 mg of urea was added to the reaction liquid, which was stirred at 0° C. for 15 minutes to prepare a diazo solution A.

50 mL of methanol was added to the intermediate (d), which was heated and dissolved. Then, the resulting mixed solution was cooled on ice and stirred. The diazo solution A was slowly added dropwise to the mixed solution (inside temperature: 10° C. or lower). The reaction liquid was stirred at room temperature for 2 hours. A crystal precipitated was filtered, washed with methanol. Thereby, a crude crystal of the Exemplary compound (Pig.-1) was obtained. Further, water was added to the crude crystal, which was stirred. The pH of the suspension was adjusted to 7 using a sodium hydroxide aqueous solution. 20 mL of dimethylacetamide was added thereto and stirred at 80° C. for 2 hours. A crystal precipitated was filtered and was suspended and washed with methanol. The obtained crystal was filtered and dried to give 2.0 g of the Exemplary compound (Pig.-1) (yellow powder, yield: 79%).

Exemplary compounds (Pig.-18), (Pig.-21), and (Pig.-33) were synthesized in a manner substantially similar to the synthetic scheme described above.

Preparation of Pigment Dispersion (Mill Base)

Each material used in the ink composition of this example is as follows:
  Triethylene glycol divinyl ether (trade name: RAPI-CURE® DVE-3, manufactured by International Specialty Products)
  Polymer dispersant, solid content: 30% (trade name: DISPERBYK-168, manufactured by BYK Chemie GmbH)

(3',4'-epoxycyclohexane) methyl-3,4-epoxycyclohexane carboxylate (trade name: CELLOXIDE 2021P, manufactured by DAICEL-CYTEC Company LTD.)

Bis(3-ethyl-3-oxetanylmethyl)ether (trade name: ARON OXETANE OXT-221, manufactured by TOAGOSEI CO., LTD.)

Sulfonium salt photo-acid generator (triarylsulfonium-hexafluoroantimonate salts in propylene carbonate (mixed) (trade name: UVI-6992, manufactured by The Dow Chemical Company)

9,10-dibutoxy anthracene (trade name: ANTHRACURE UVS-1331, manufactured by Kawasaki Kasei Chemicals, Ltd.)

Silicone surfactant (trade name: BYK-307, manufactured by BYK-Chemie GmbH)

Preparation of Pigment Dispersion (Mill Base)

The yellow mill base having the following formulation was mixed and stirred at 3,000 rpm for 10 minutes with a mixer (trade name. L4R, manufactured by Silverson Machines, Inc.). Thereafter, the resulting product was placed into a bead mill disperser (DISPERMAT® SL, manufactured by VMA-GETZMANN GmbH), which was dispersed using zirconia beads (trade name: YTZ ball, manufactured by and Nikkato Corporation) having a diameter of 0.65 mm at a filling factor of 80% by volume at 2,500 rpm for 6 hours to produce a yellow mill base YM1.

Yellow Mill Base YM1
Pigment: Exemplary compound (Pig.-1) 30.0 parts
RAPI-CURE® DVE-3 28.0 parts
DISPERBYK-168 42.04 parts Example 1

The mixture of the following components for forming Ink composition 1 were stirred at 2,500 rpm for 15 minutes with a mixer (trade name: L4R, manufactured by Silverson Machines, Inc.) and a yellow ink composition (ink composition of Experimental example 101) of Example 1 was obtained. The viscosity at 25° C. was measured using (trade name: TVE-22LT, manufactured by TOKI SANGYO CO., LTD.) and it was 18.5 mPa·s.

The surface tension at 25° C. was measured using a full automatic surface tensiometer (trade name: CBVP-Z, manufactured by Kyowa Interface Science Co., LTD. and it was 27.6 mN/m.

Formulation of Ink Composition 1

| | |
|---|---|
| CELLOXIDE 2021P (described above) | 30.0 parts |
| ARON OXETANE OXT-221 (described above) | 34.3 parts |
| RAPI-CURE ® DVE-3 | 13.6 parts |
| UVI-6992 (described above) | 9.0 parts |
| ANTHRACURE UVS-1331 (described above) | 3.0 parts |
| BYK-307 (described above) | 0.1 parts |
| Yellow mill base YM1 | 10.0 parts |

Ink compositions 2 to 8 and 11, which are exemplary embodiments of the invention, and Ink compositions 9, 10 and 12, which are comparative examples, were prepared in the similar manner as Ink composition 1, except that: the Exemplified compound (Pig.-1) was changed to the corresponding amount of the Exemplified compound (Pig.-18), (Pig.-21) or (Pig.-33) or C.I. Pigment Yellow 150; the polymer dispersant DISPERBYK-168 was changed to the corresponding amount of AJISPER PB822; and/or the phoro-acid generator UVI-6992 was changed to the corresponding amount of the "phoro-acid generator 1" described in example 1 of JP-A No. 2008-207425 as shown in the following Table 1.

Evaluation of Ejection Stability (Accuracy in Ejection of Ink)

The obtained ink compositions for inkjet recording (Ink compositions 1 to 12) were respectively placed into a container made of PET, which was then sealed and left at 75° C. for 2 weeks. An inkjet recording apparatus (trade name: JET-LYZER, manufactured by MIMAKI ENGINEERING CO., LTD.) equipped with an inkjet head (trade name: CA3, manufactured by TOSHIBA TEC CORPORATION) was set under conditions (ejection voltage: 22V, ejected drop: 7 drops). The ink composition was continuously ejected at 45° C. for 30 minutes and then a 10-cm line was printed. A PET film having a thickness of 100 μm was used as the recorded medium.

The ejected ink on the recording medium was further subjected to irradiation with energy of 200 mJ/cm$^2$ with a 200-W super-high-pressure-mercury lamp to be cured. The irradiation was performed immediately about 0.5 second after the printing.

The distances between lines in a 5 cm-region from the initiation site of dotting with droplets on the obtained printed medium were measured with a dot analyzer DA-6000 (trade name, manufactured by Oji Scientific Instruments), and the standard deviation of the measured distances was calculated. From the obtained value, the accuracy in ejection direction was evaluated under the following evaluation criteria. Evaluation results are shown in Table 1.

Evaluation Criteria

AA: The standard deviation is less than 2 μm.

A: The standard deviation is 2 μm or more and less than 4 μm.

B: The standard deviation is 4 μm or more and less than 6 μm.

C: The standard deviation is 6 μm or more.

Evaluation of Streak-Like Unevenness in Printed Image

Inkjet recording and curing were performed in the similar manner as in the evaluation of ejection stability shown above, except that an image of 10 cm×10 cm was printed under 100%-ejecting condition in place of the 10-cm line. The presence of streak-like image defect in the thus-obtained printed image, which relies on accuracy in ink ejection direction, was observed to evaluate the streak-like unevenness suppressing property under the following evaluation criteria. Evaluation results are shown in Table 1.

Evaluation Criteria

AA: No image defect is observed.

A: Very slight streak-like unevenness is observed.

B: Substantially non-problematic, although slight streak-like unevenness is observed at a glance.

C: Streak-like unevenness is clearly observed.

Evaluation of Unevenness in Density in Printed Image

The printed image was divided into nine equal parts (three by three) and subjected to measurement of the color difference Δ, that is the difference between the maximum value and the minimum value of chromaticity, with a colorimeter (trade name: Model CR210, manufactured by Konica Minolta Sensing Inc.). The thus-obtained color difference was evaluated under the following evaluation criteria. Evaluation results are shown in Table 1.

AA: The color difference is less than 0.3. No unevenness in density in a printed image was observed by naked eyes.

A: The color difference is 0.3 or more and less than 0.6.

B: The color difference is 0.6 or more and less than 1.0.

C: The color difference is 1.0 or more.

TABLE 1

| | Ink composition | | | Evaluation | | | |
|---|---|---|---|---|---|---|---|
| | Azo pigment or comparative pigment | Polymer dispersant | Cationic polymerization initiator | Ejection accuracy | Streak-like unevenness | Unevenness in density | Remarks |
| Ink composition 1 | Exemplary compound (Pig. 1) | DISPERBYK-168 | UVI-6992 | AA | AA | AA | The invention |
| Ink composition 2 | Exemplary compound (Pig. 1) | AJISPER PB822 | UVI-6992 | AA | AA | AA | The invention |
| Ink composition 3 | Exemplary compound (Pig. 18) | DISPERBYK-168 | UVI-6992 | AA | AA | AA | The invention |
| Ink composition 4 | Exemplary compound (Pig. 18) | AJISPER PB822 | UVI-6992 | AA | A | AA | The invention |
| Ink composition 5 | Exemplary compound (Pig. 21) | DISPERBYK-168 | UVI-6992 | A | A | AA | The invention |
| Ink composition 6 | Exemplary compound (Pig. 21) | AJISPER PB822 | UVI-6992 | A | A | A | The invention |
| Ink composition 7 | Exemplary compound (Pig. 33) | DISPERBYK-168 | UVI-6992 | A | A | AA | The invention |
| Ink composition 8 | Exemplary compound (Pig. 33) | AJISPER PB822 | UVI-6992 | A | A | A | The invention |
| Ink composition 9 | C.I. PIGMENT YELLOW 150 | DISPERBYK-168 | UVI-6992 | C | C | C | Comparative example |
| Ink composition 10 | C.I. PIGMENT YELLOW 150 | AJISPER PB822 | UVI 6992 | C | C | C | Comparative example |
| Ink composition 11 | Exemplary compound (Pig. 1) | AJISPER PB822 | Photo-acid generator 1 | AA | AA | AA | The invention |
| Ink composition 12 | C.I. PIGMENT YELLOW 150 | AJISPER PB822 | Photo-acid generator 1 | C | C | C | Comparative example |

The structure of the cationic polymerization initiator "photo-acid generator 1" used in the ink compositions 11 and 12 are shown below.

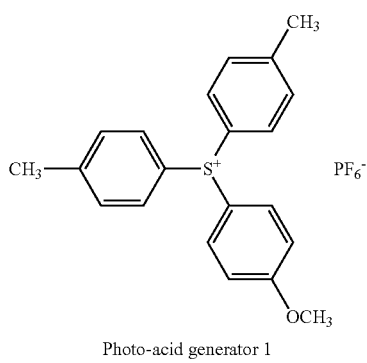

Photo-acid generator 1

From the evaluation results of Ink compositions 1 to 8 and 11, it is found that excellent ink ejection accuracy may be obtained even after storage at high temperatures when the Exemplary compound (Pig.-1), (Pig.-18), (Pig.-21), or (Pig.-33), which are the specific azo pigment of the invention, are used as the pigment.

From the evaluation results of Ink compositions 9, 10 and 12, it is found that the ink ejection accuracy may be deteriorated when C.I. Pigment Yellow 150 is used as the pigment in place of the Exemplary compounds.

Example 2

Preparation of Yellow Pigment Dispersion Liquid

A yellow pigment dispersion liquid was prepared according to the method described in example 1 of JP-A No. 2008-207425.

First, 8 parts by mass of AJISPER PB822 (described above) and 72 parts by mass of ARON OXETANE OXT-221 (described above) were charged into a stainless steel beaker and dissolved with heating the beaker on a hot plate at 65° C. and stirring.

Then, the resulted solution was cooled to room temperature, and 20 parts by mass of C.I. Pigment Yellow 150 was added thereto. This solution was placed into a glass bottle together with 200 parts by mass of zirconia beads having a diameter of 0.3 mm, sealed, and was subjected to dispersing using a paint shaker for 4 hours. Thereafter, the zirconia beads were removed to prepare a yellow pigment dispersion liquid.

Preparation of Ink Composition

Yellow ink composition 13 was prepared using the thus-prepared yellow pigment dispersion liquid containing 20% by mass of yellow pigment, 8% by mass of the dispersant AJISPER PB822 (described above) and 72% by mass of the photopolymerizable compound ARON OXETANE OXT-221 (described above) and the following additives.

Specifically, all of the following additives other than the yellow pigment dispersion were firstly mixed. After confirming that the mixed solution was sufficiently dissolved, the mixed solution was gradually added to the yellow pigment dispersion with stirring. After stirring for 15 minutes, the resulting product was filtered with a polypropyrene disc filter (manufactured by ROKI TECHNO CO., LTD., filtration rating: 3 μm).

Then, the filtrated resultant was de-gassed with a deaerating module using a hollow fiber membrane (trade name. SEPAREL PF-004D, manufactured by DIC Corporation) under the condition for make the dissolved oxygen saturation factor be 80%. After the deaeration, the resulting product, which had yellow color and was defined as Ink composition 13, was placed in a stainless steel container having a stainless steel lid.

Formulation of Ink Composition 13

| | |
|---|---|
| Yellow pigment dispersion liquid | 20.0 parts |
| AJISPER PB822 (described above) | 2.0 parts |
| ARON OXETANE OXT-221 (described above) | 55.0 parts |
| ARON OXETANE OXT-212 | 5.0 parts |
| (trade name, manufactured by TOAGOSEI CO., LTD.) | |
| ARON OXETANE OXT-211 | 5.0 parts |
| (trade name, manufactured by TOAGOSEI CO., LTD.) | |
| Alicyclic epoxy compound 1 | 18.0 parts |
| Photo-acid generator 1 (molecular weight: 466) | 4.0 parts |
| Polymerization inhibitor (triisopropanolamine) | 0.1 part |

OXT-221

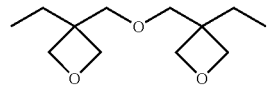

OXT-211

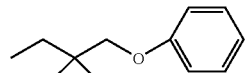

OXT-212

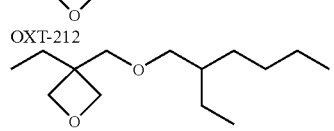

Alicyclic epoxy compound 1

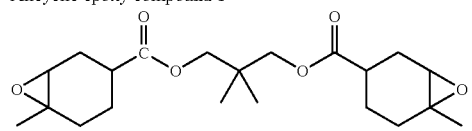

Photo-acid generator 1

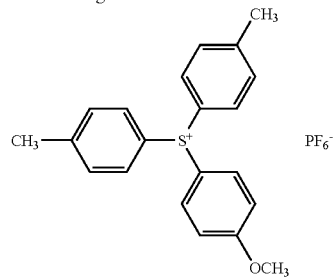

The thus-prepared Ink composition 13 was subjected to the evaluation of ink ejection accuracy in the similar manner as the ink compositions of Example 1 to turn out that it revealed inferior ink ejection accuracy of grade C.

Ink compositions 14 to 17 were further prepared in the similar manner as that of Ink composition 13 except that C.I. Pigment Yellow 150 was changed to the Exemplary compound (Pig.-1), (Pig.-18), (Pig.-21), or (Pig.-33) in the respective ink compositions. It turned out that the thus-prepared Ink compositions 14 to 17 revealed excellent ink ejection accuracy. Specifically, Ink composition 14, which contains (Pig.-1), revealed ink ejection accuracy of grade AA; Ink composition 15, which contains (Pig.-18), revealed ink ejection accuracy of grade A; Ink composition 16, which contains (Pig.-21), revealed ink ejection accuracy of grade A; and Ink composition 17, which contains (Pig.-33), revealed ink ejection accuracy of grade A.

Example 3

The ink compositions for inkjet recording of Examples 1 and 2 were prepared and subjected to the evaluation of ink ejection accuracy in the similar manner as the samples of Examples 1 to 2, except that the inks were placed into a container made of high density polyethylene, which was then sealed and left at room temperature for 2 months in place of being placed into the PET container to be sealed and left at 75° C. for 2 weeks. It turned out that the thus-prepared ink compositions revealed excellent ink ejection accuracy that is similar to those of the samples of the invention shown in Examples 1 to 2.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:
1. A radiation-curable ink composition for inkjet recording, the ink composition comprising:
an azo compound represented by Formula (1), a tautomer of the azo compound, a salt of the azo compound, a salt of the tautomer, a hydrate of the azo compound, a hydrate of the tautomer, or any combination thereof;
a polymer dispersant;
a cationic polymerizable compound; and
a cationic polymerization initiator:

Formula (1)

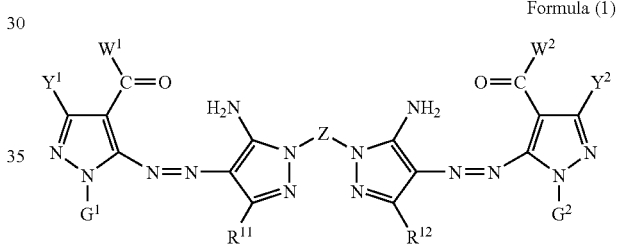

wherein, in Formula (1): Z represents a divalent group having a 5- to 8-membered nitrogen-containing heterocycle;
$Y^1$ and $Y^2$ each independently represent a hydrogen atom, a halogen atom, an alkyl group, an aralkyl group, an alkenyl group, an alkynyl group, an aryl group, a heterocyclic group, a cyano group, a hydroxy group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group, or a silyl group;
$R^{11}$ and $R^{12}$ each independently represent a hydrogen atom, a straight chain or branched alkyl group having from 1 to 12 carbon atoms, a straight chain or branched aralkyl group having from 7 to 18 carbon atoms; a straight chain or branched alkenyl group having from 2 to 12 carbon atoms; a straight chain or branched alkynyl group having from 2 to 12 carbon atoms; a straight chain or branched cycloalkyl group having from 3 to 12 carbon atoms; a straight chain or branched cycloalkenyl group having from 3 to 12 carbon atoms; a halogen atom; an aryl group; a heterocyclic group; a cyano group; a hydroxy group; a nitro group; a carboxy group; an amino group; an alkyloxy group; an aryloxy group; an acylamino group; an alkylamino group; an arylamino group; a ureido group; a sulfamoylamino group; an alkylthio group; an arylthio group; an alkyloxycarbonylamino group; an alkylsulfonylamino group; an arylsulfonylamino group; a carbamoyl group; a sulfamoyl group; a sulfonyl group; an alkyloxycarbonyl group; a heterocyclic oxy group; an azo group; an acyloxy group; a carbamoyloxy group; a silyloxy group; an aryloxycarbonylamino group; an imido group; a heterocyclic thio group; a sulfonyl group; a phosphonyl group; an aryloxycarbonyl group; an acyl group; or an ionic hydrophilic group;

$G^1$ and $G^2$ each independently represent a hydrogen atom, an alkyl group, a cycloalkyl group, an aralkyl group, an alkenyl group, an alkynyl group, an aryl group or a heterocyclic group; and $W^1$ and $W^2$ each independently represent an alkoxy group, an amino group, an alkyl group, or an aryl group.

2. The radiation-curable ink composition for inkjet recording of claim 1, wherein, in Formula (1), $W^1$ and $W^2$ each independently represent an alkoxy group having 3 or fewer carbon atoms, an amino group, or an alkylamino group having 3 or fewer carbon atoms.

3. The radiation-curable ink composition for inkjet recording of claim 1, wherein, in Formula (1), $G^1$ and $G^2$ each independently represent an alkyl group having 3 or fewer carbon atoms.

4. The radiation-curable ink composition for inkjet recording of claim 1, wherein, in Formula (1), Z represents a divalent group having a 6-membered nitrogen-containing heterocycle.

5. An inkjet recording method comprising:

ejecting the ink composition of claim 1 onto a recording medium; and curing the ejected ink composition by irradiating the ejected ink composition with active radiation.

6. Printed matter formed by the inkjet recording method of claim 5.

7. Printed matter comprising, on a recording medium, an image formed from the radiation-curable ink composition for inkjet recording of claim 1 which is ejected onto the recording medium and cured by being irradiated with active radiation.

8. The radiation-curable ink composition for inkjet recording of claim 1, wherein, in Formula (1), Z represents one selected from the group consisting of: a divalent group having a 5-membered nitrogen-containing heterocycle; a divalent group having a 7-membered nitrogen-containing heterocycle; a divalent group having an 8-membered nitrogen-containing heterocycle; a divalent group having a pyridine ring; and a group represented by the following Formula:

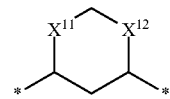

wherein in the Formula, $X^{11}$ and $X^{12}$ each independently represent a heteroatom, and an asterisk (*) represents a position at which the nitrogen atom adjacent to Z is linked.

9. The radiation-curable ink composition for inkjet recording of claim 8, wherein $X^{11}$ and $X^{12}$ respectively represent a nitrogen atom.

* * * * *